(12) United States Patent
Lawyer et al.

(10) Patent No.: US 10,440,940 B2
(45) Date of Patent: Oct. 15, 2019

(54) LIGHTING UNIT AND METHOD OF CONTROLLING

(71) Applicant: EcoTech Marine, LLC, Allentown, PA (US)

(72) Inventors: Justin Lawyer, Bethlehem, PA (US); Patrick Clasen, Bethlehem, PA (US); Timothy Marks, Northampton, PA (US); Mark Lindenmoyer, Coopersburg, PA (US)

(73) Assignee: EcoTech Marine, LLC, Allentown, PA (US)

( * ) Notice: Subject to any disclaimer, the term of this patent is extended or adjusted under 35 U.S.C. 154(b) by 0 days.

(21) Appl. No.: 15/839,054

(22) Filed: Dec. 12, 2017

(65) Prior Publication Data

US 2018/0184628 A1    Jul. 5, 2018

Related U.S. Application Data

(63) Continuation of application No. 13/530,916, filed on Jun. 22, 2012, now Pat. No. 9,839,206.

(60) Provisional application No. 61/530,062, filed on Sep. 1, 2011, provisional application No. 61/499,763, filed on Jun. 22, 2011.

(51) Int. Cl.
| | | |
|---|---|---|
| *H05B 33/00* | (2006.01) | |
| *A01K 63/06* | (2006.01) | |
| *H05B 33/08* | (2006.01) | |
| *F21V 29/67* | (2015.01) | |
| *F21W 131/308* | (2006.01) | |
| *F21Y 105/10* | (2016.01) | |
| *F21Y 115/10* | (2016.01) | |

(52) U.S. Cl.
CPC ............ *A01K 63/06* (2013.01); *F21V 29/67* (2015.01); *H05B 33/089* (2013.01); *H05B 33/0854* (2013.01); *H05B 33/0872* (2013.01); *F21W 2131/308* (2013.01); *F21Y 2105/10* (2016.08); *F21Y 2115/10* (2016.08)

(58) Field of Classification Search
CPC ............ H05B 37/0272; H05B 37/0227; H05B 33/0872; H05B 37/0281; H05B 33/0854; H05B 37/0218; H05B 33/0803; H05B 37/02; H05B 39/086; H05B 39/088; H05B 33/08; H05B 33/0857; H05B 37/0236; H05B 37/0245
See application file for complete search history.

(56) References Cited

U.S. PATENT DOCUMENTS

| | | | |
|---|---|---|---|
| 4,151,810 | A | 5/1979 | Wiggins |
| 4,773,008 | A | 9/1988 | Schroeder |
| 5,117,233 | A | 5/1992 | Hamos et al. |
| 5,173,973 | A | 12/1992 | Mersmann |
| 5,220,881 | A | 6/1993 | Sandor, Jr. |
| 5,522,700 | A | 6/1996 | Hong |
| 5,689,404 | A | 11/1997 | Katsui |
| 6,004,010 | A | 12/1999 | Inage et al. |
| 6,402,346 | B1 | 6/2002 | Liao |
| 6,568,425 | B2 | 5/2003 | Gergek |

(Continued)

FOREIGN PATENT DOCUMENTS

WO    WO2011057343    5/2011

*Primary Examiner* — Monica C King
(74) *Attorney, Agent, or Firm* — Berenato & White, LLC

(57) ABSTRACT

A lighting unit for illuminating a habitat is provided. The lighting unit includes a housing and a light emitter. The operating parameters of the lighting unit may be adjusted to mimic different natural conditions.

21 Claims, 21 Drawing Sheets

(56) References Cited

U.S. PATENT DOCUMENTS

| | | |
|---|---|---|
| 6,736,195 B2 | 5/2004 | Busch |
| 6,778,390 B2 | 8/2004 | Michael |
| 7,046,163 B2 | 5/2006 | Macey |
| 7,063,504 B2 | 6/2006 | Huang et al. |
| 7,178,178 B2 | 2/2007 | Hutchings |
| 7,220,018 B2 | 5/2007 | Crabb |
| 7,249,571 B2 | 7/2007 | Allis |
| 7,405,932 B2 | 7/2008 | Vinson |
| 7,458,697 B2 | 12/2008 | Ueda |
| 7,470,043 B2 | 12/2008 | Mehta |
| 8,029,169 B2 | 10/2011 | Liu |
| 8,118,462 B2 | 2/2012 | Inoue et al. |
| 8,143,811 B2 | 3/2012 | Shloush |
| 8,198,826 B2 | 6/2012 | Lin et al. |
| 8,230,904 B2 | 7/2012 | Xu |
| 8,303,141 B2 | 11/2012 | Jiang |
| 8,319,408 B1 | 11/2012 | Horng |
| 8,464,442 B1 | 6/2013 | Alford, II et al. |
| 8,508,116 B2 | 8/2013 | Negley |
| 8,517,574 B2 | 8/2013 | Horng et al. |
| 8,523,385 B2 | 9/2013 | Lu |
| 8,531,110 B2 | 9/2013 | Beasley |
| 8,567,990 B2 | 10/2013 | Betsuda et al. |
| 8,568,009 B2 | 10/2013 | Chiang et al. |
| 8,572,889 B1 | 11/2013 | Hughes |
| 8,746,937 B2 | 6/2014 | Hong et al. |
| 8,847,514 B1 | 9/2014 | Reynoso |
| 8,863,694 B2 | 10/2014 | Bourget et al. |
| 8,872,998 B2 | 10/2014 | Kamiyama et al. |
| 8,882,297 B2 | 11/2014 | Flaherty et al. |
| 9,010,019 B2 | 4/2015 | Mittelmark |
| 9,166,811 B2 | 10/2015 | Lawyer |
| 9,404,648 B2 | 8/2016 | Druchinin |
| 2002/0035403 A1 | 3/2002 | Clark et al. |
| 2003/0126679 A1 | 7/2003 | Leung et al. |
| 2004/0018104 A1 | 1/2004 | Watkins |
| 2004/0255375 A1 | 12/2004 | Scarlata |
| 2005/0135104 A1 | 6/2005 | Crabb et al. |
| 2006/0210412 A1 | 9/2006 | Lawyer et al. |
| 2007/0058368 A1 | 3/2007 | Partee |
| 2007/0081888 A1 | 4/2007 | Harrison |
| 2007/0154322 A1 | 7/2007 | Stiles, Jr. et al. |
| 2008/0075581 A1 | 3/2008 | Chen |
| 2008/0212333 A1 | 9/2008 | Chen |
| 2008/0253080 A1 | 10/2008 | He et al. |
| 2008/0290816 A1 | 11/2008 | Chen et al. |
| 2009/0072944 A1 | 3/2009 | Hayward |
| 2009/0190336 A1 | 7/2009 | Teng et al. |
| 2009/0213585 A1 | 8/2009 | Chern et al. |
| 2009/0288340 A1 | 11/2009 | Hess |
| 2010/0020537 A1 | 1/2010 | He et al. |
| 2010/0076620 A1 | 3/2010 | Loebl |
| 2010/0096993 A1 | 4/2010 | Ashdown |
| 2010/0115830 A1 | 5/2010 | Dube |
| 2010/0128473 A1 | 5/2010 | Parra |
| 2010/0259935 A1 | 10/2010 | Scordino |
| 2010/0315004 A1 | 12/2010 | Horng et al. |
| 2011/0037367 A1 | 2/2011 | Wang et al. |
| 2011/0153053 A1 | 6/2011 | Kim |
| 2011/0187291 A1 | 8/2011 | Plischke |
| 2011/0285267 A1 | 11/2011 | Lu |
| 2011/0310621 A1 | 12/2011 | Van Der Stock et al. |
| 2012/0228529 A1 | 9/2012 | Trewin et al. |
| 2013/0294065 A1 | 11/2013 | Wells |

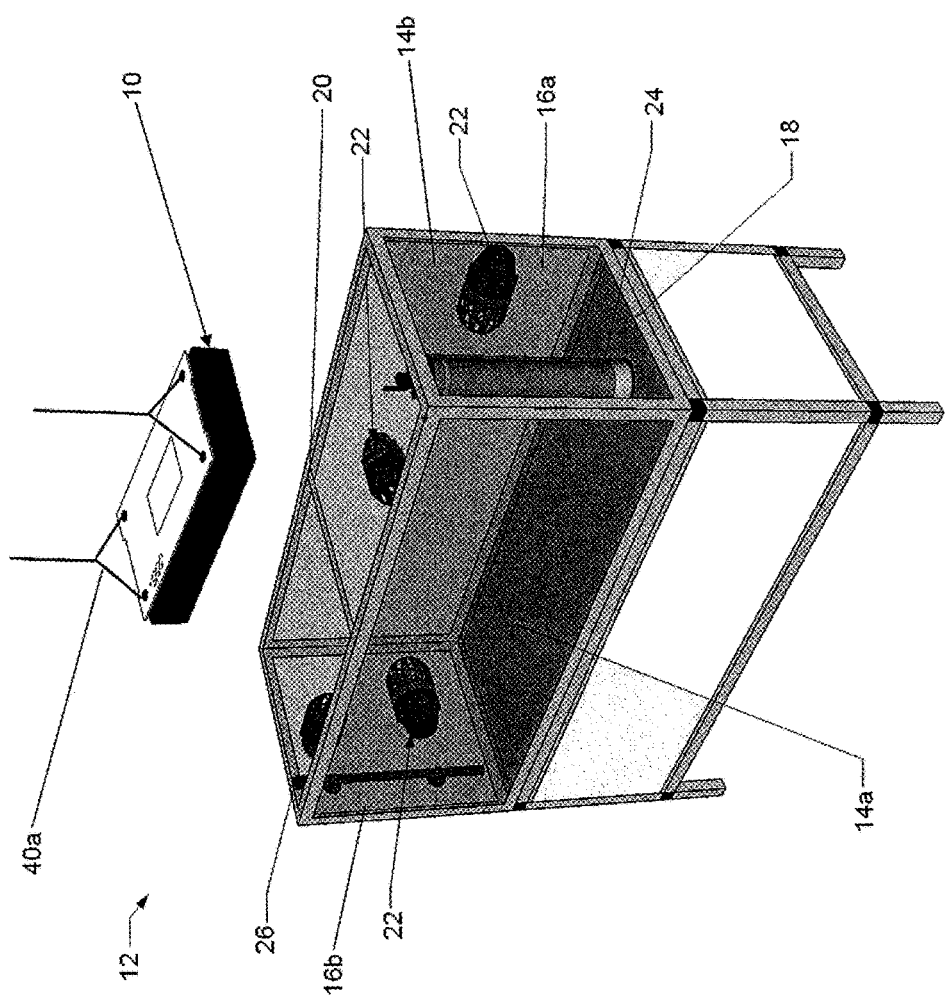

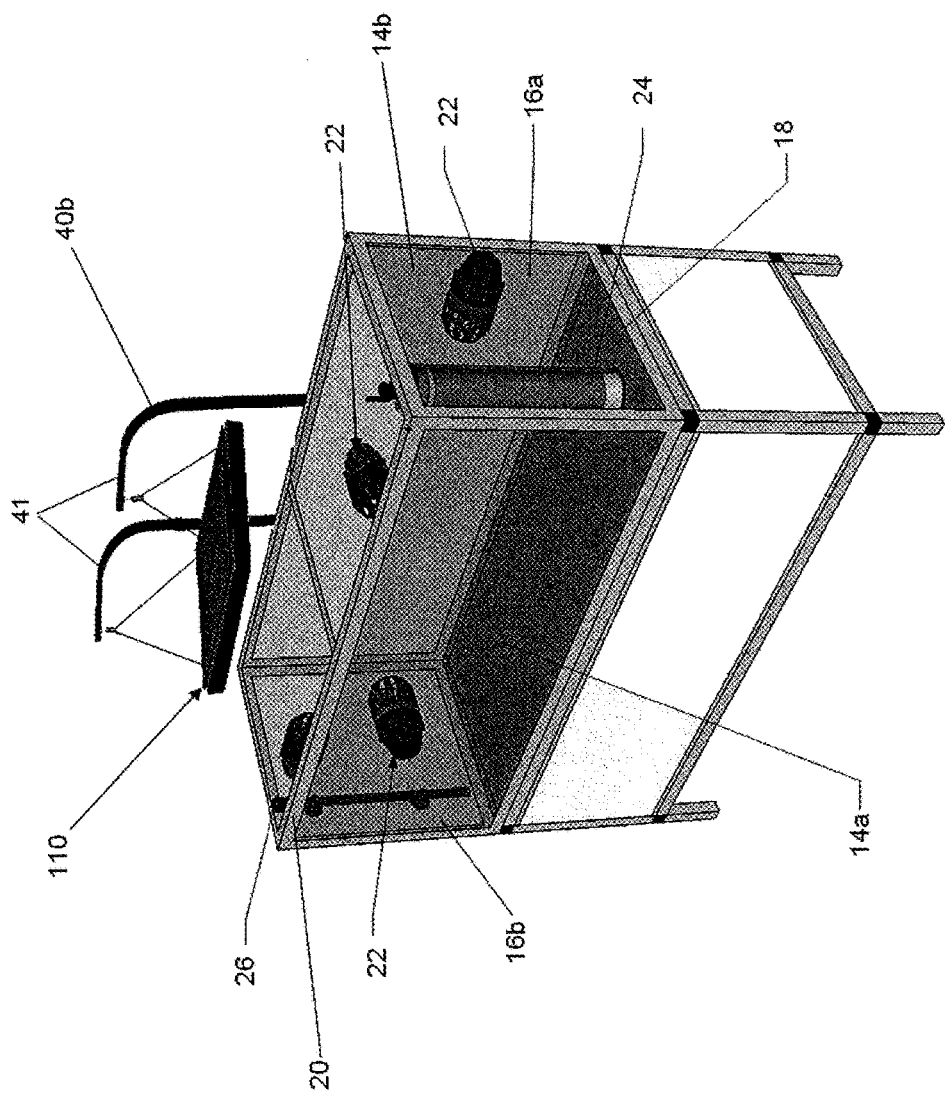

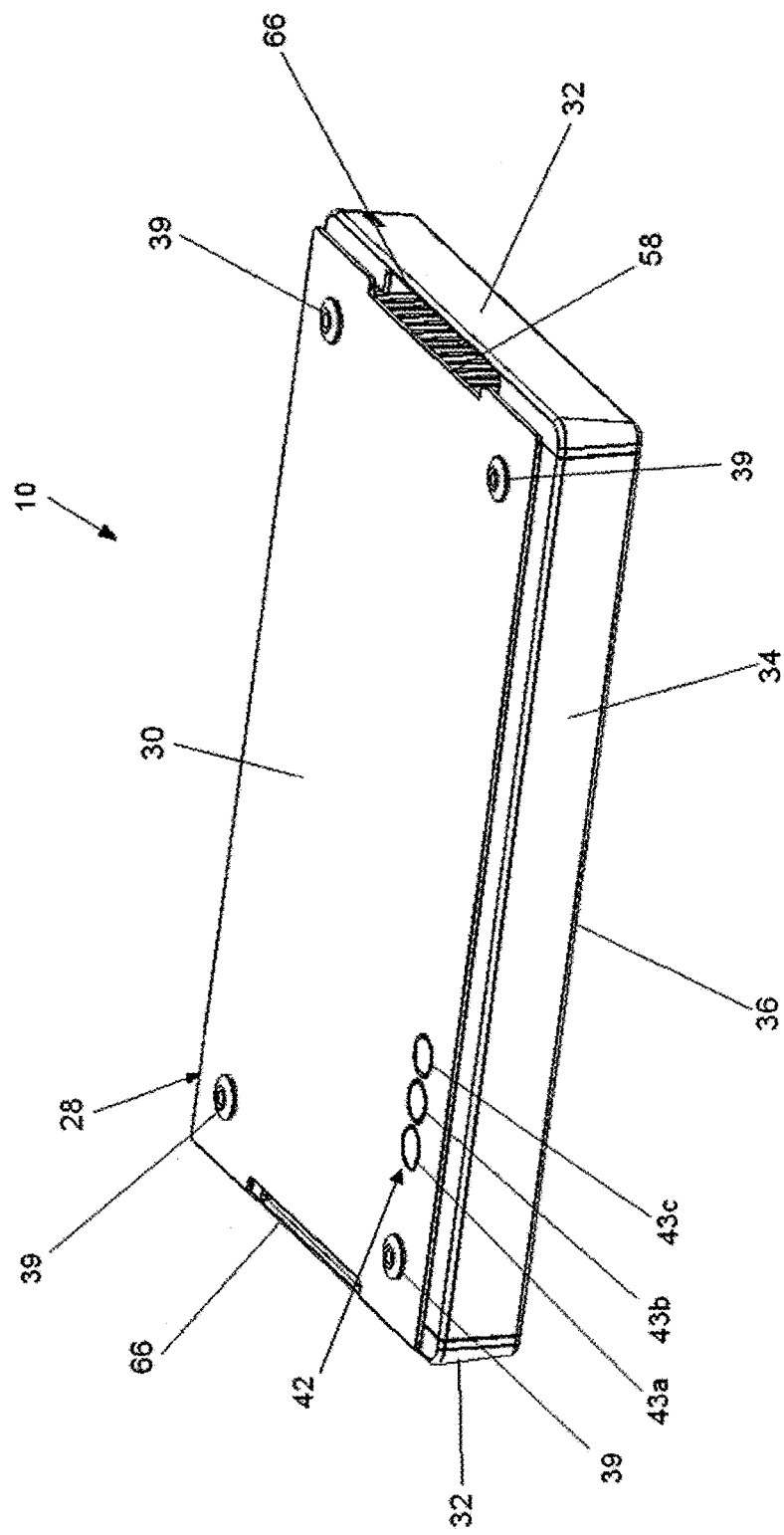

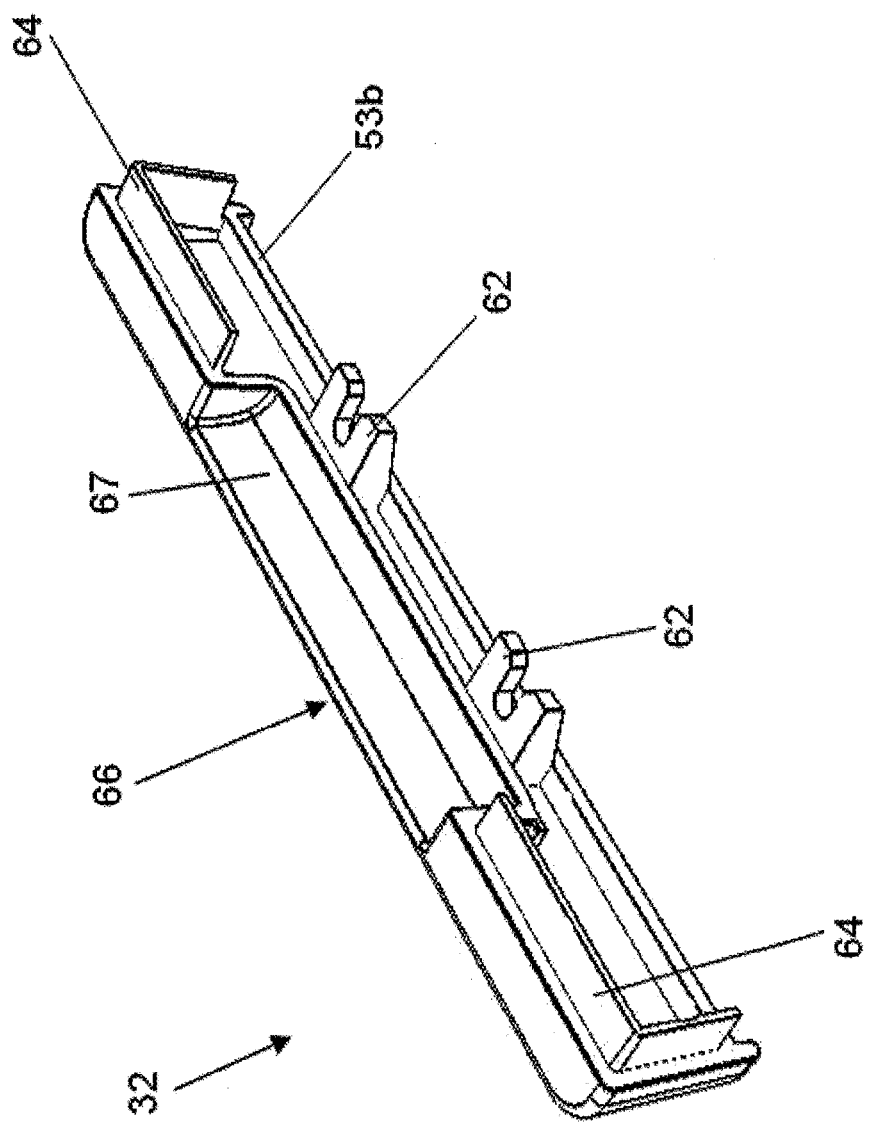

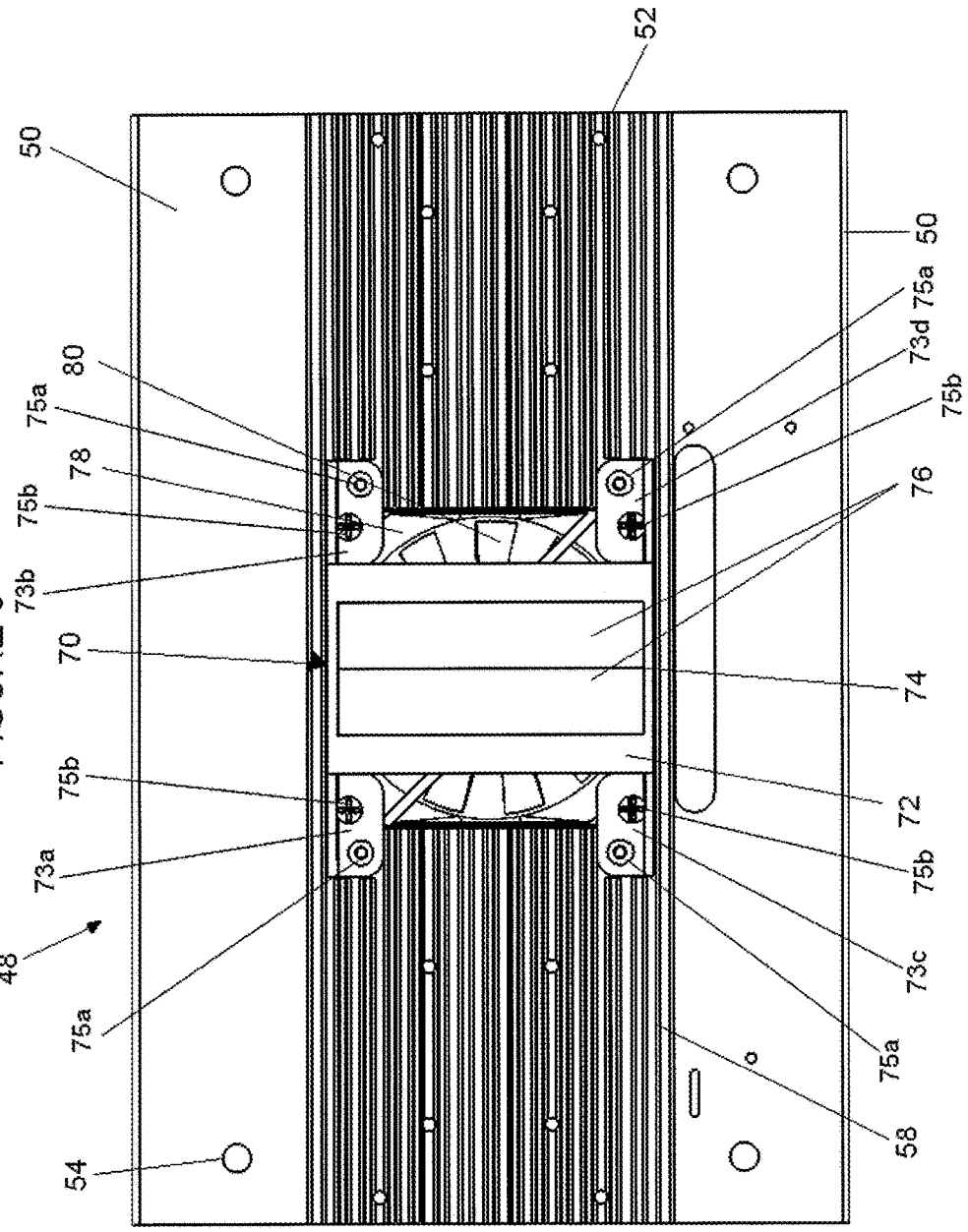

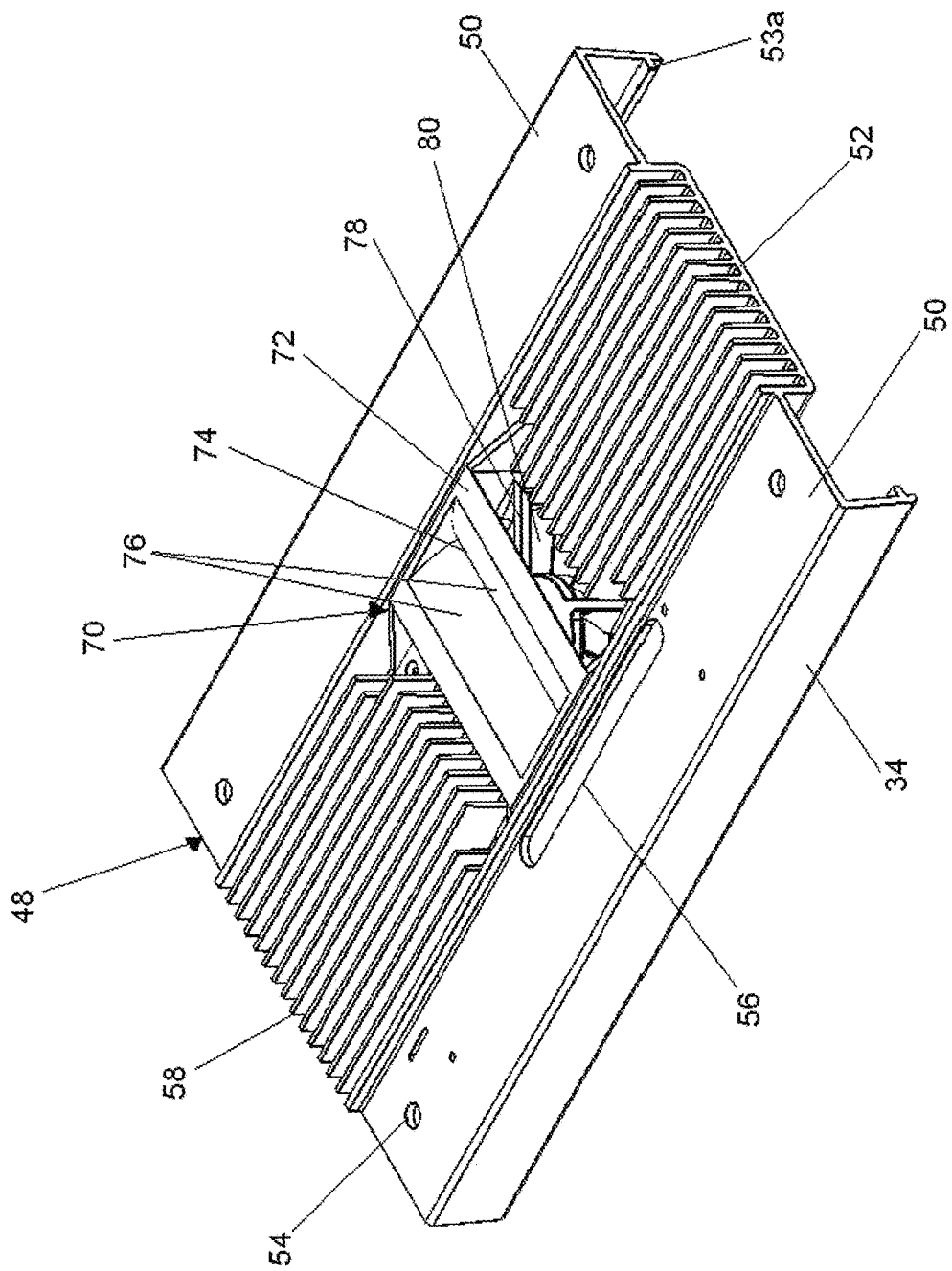

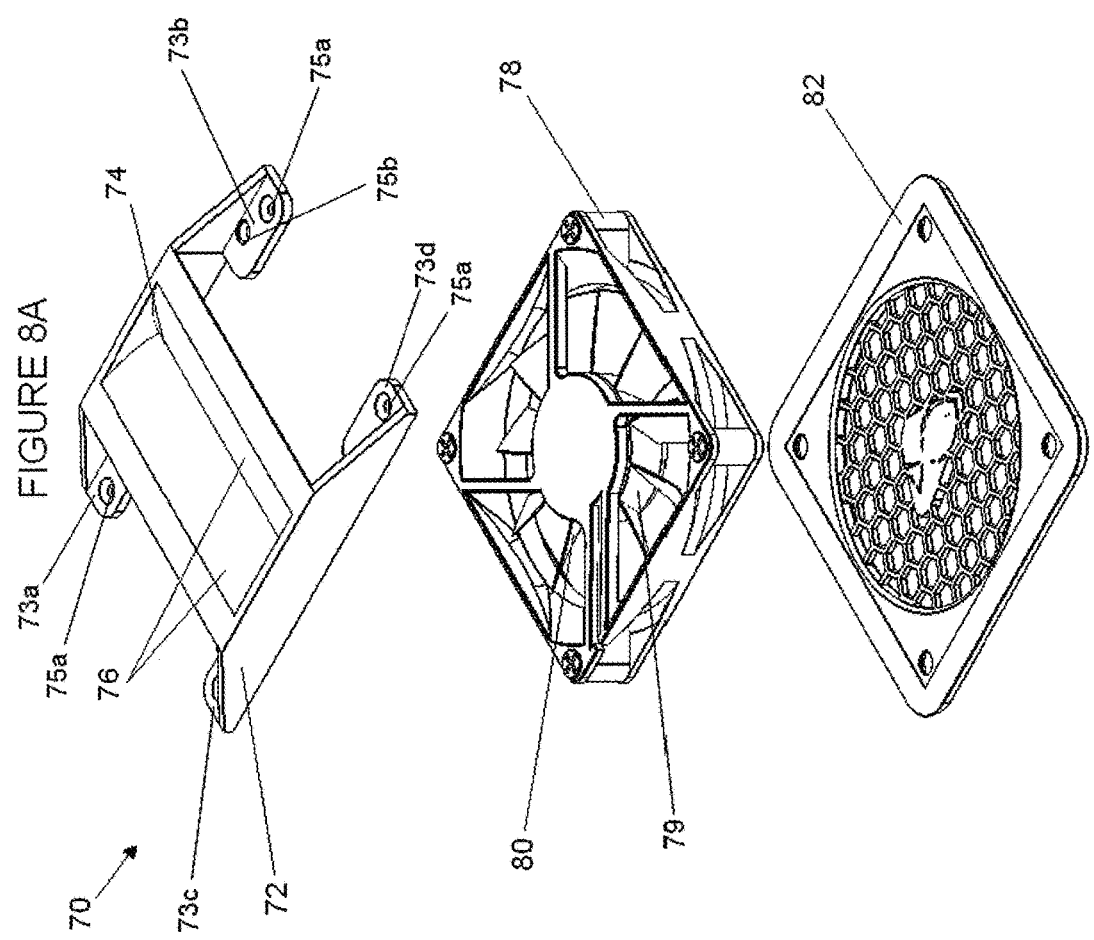

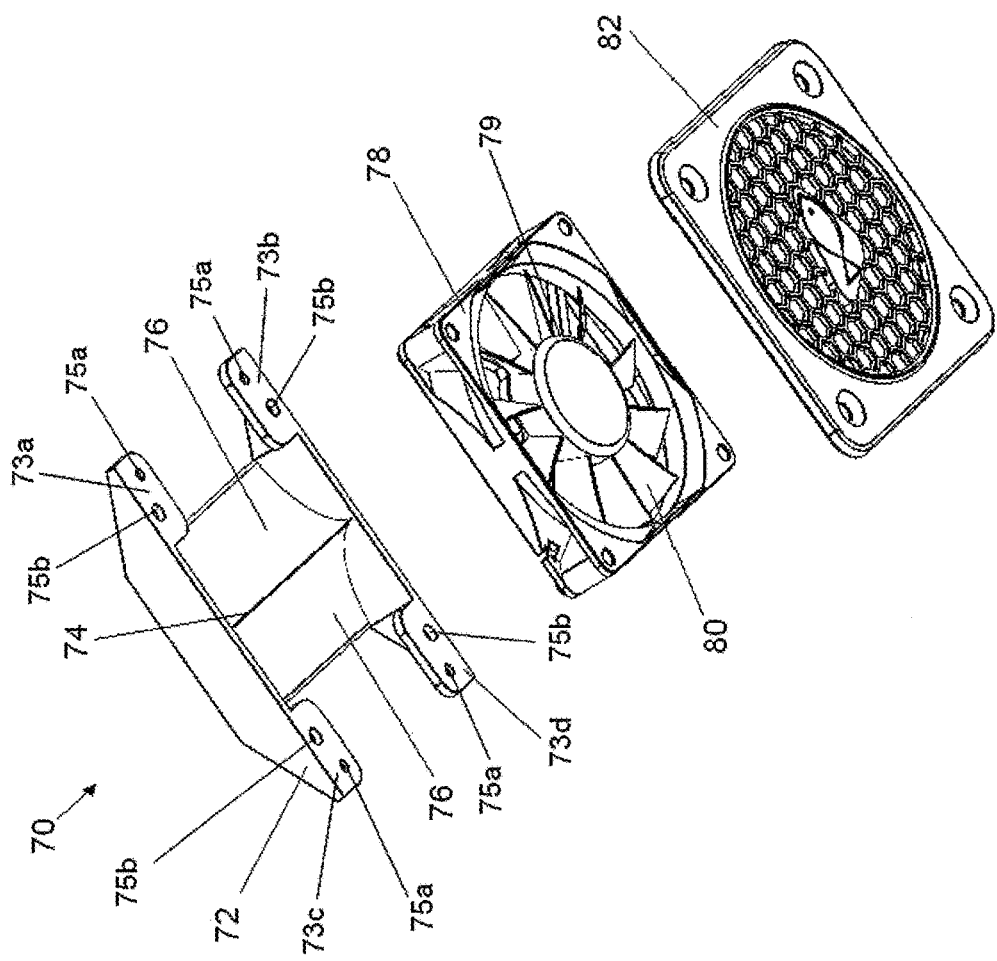

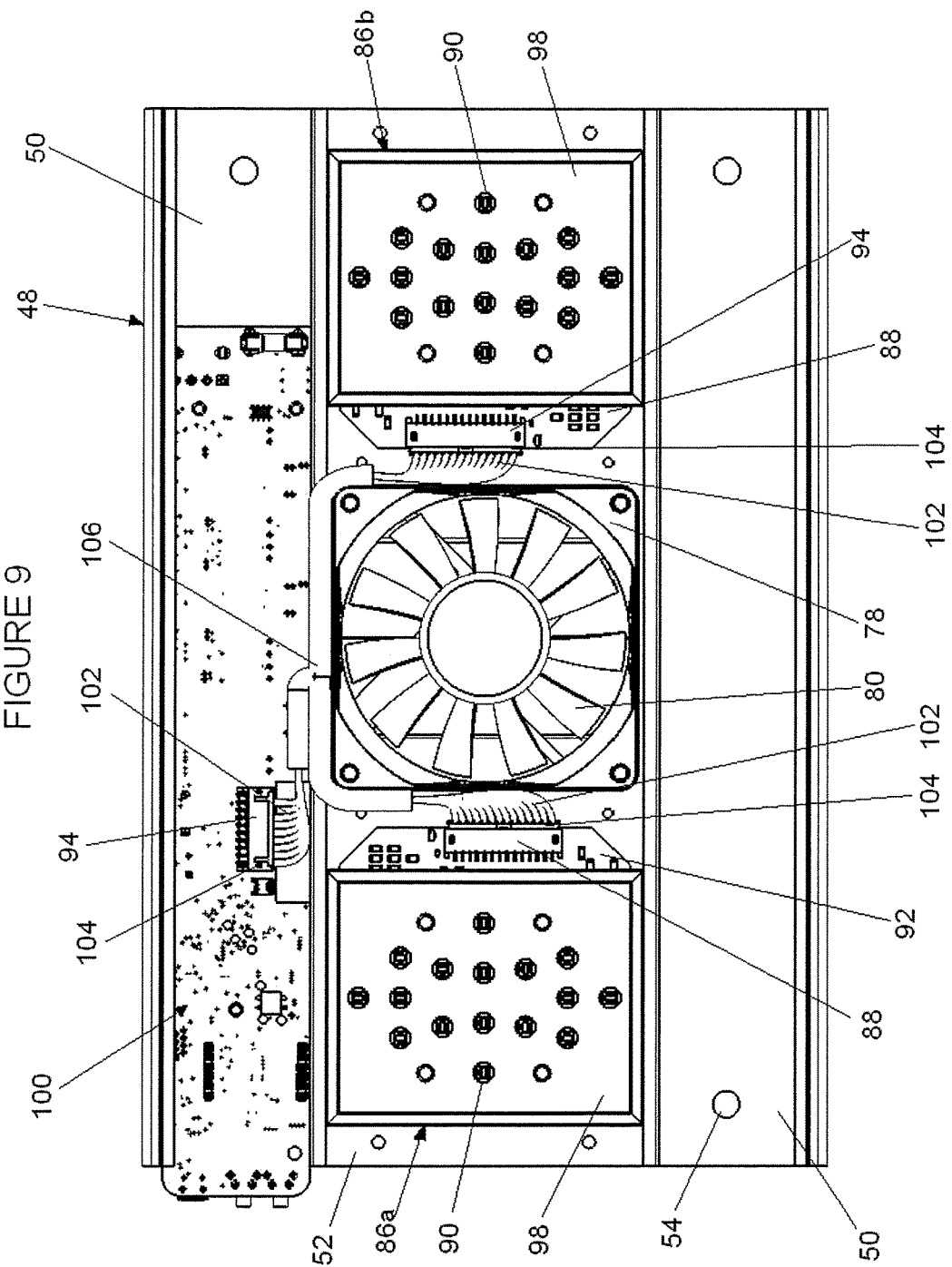

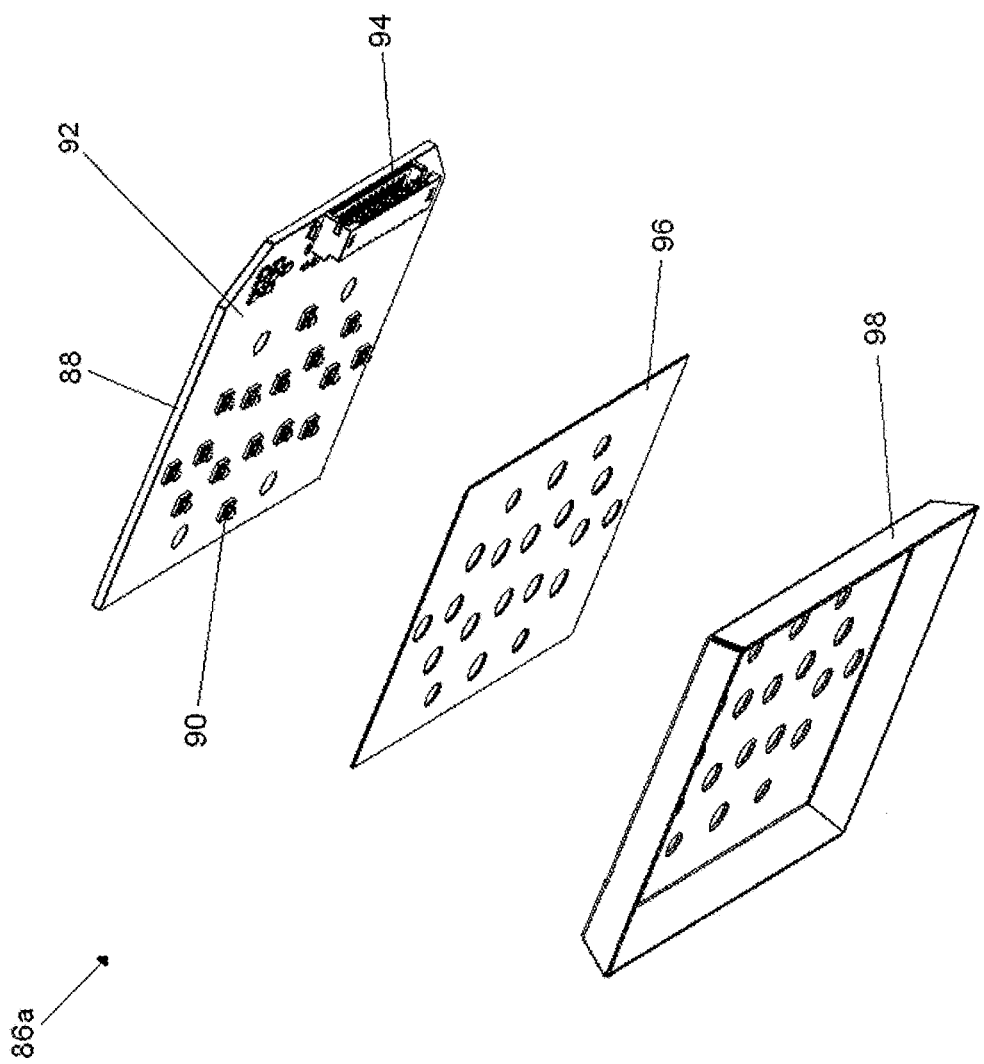

LIGHTING UNIT AND METHOD OF CONTROLLING

CROSS REFERENCE TO RELATED APPLICATIONS AND CLAIMS TO PRIORITY

This application is a continuation of U.S. application Ser. No. 13/530,916, filed Jun. 22, 2012, now U.S. Pat. No. 9,839,206, which claims the benefit of priority to provisional application Ser. No. 61/499,763, filed Jun. 22, 2011, and provisional application Ser. No. 61/530, 062, filed on Sep. 1, 2011, the disclosures of which are incorporated herein by reference and to which priority is claimed.

BACKGROUND

Animal and plant habitats, for example aquariums, terrariums, green houses, etc., are environments housing one or more species of flora and/or fauna, such as fish, invertebrates, amphibians, marine mammals, turtles, plants or any combination thereof. These species require diligent care which includes specific control of environmental conditions within the habitats. Environmental conditions such as temperature, light wavelength and intensity, salinity, and flow control of air or water inside the habitat must be regulated to accommodate for the sustainability or growth of the particular species living therein. Optimum conditions will vary from species to species.

One component of controlling the environmental conditions in a habitat is the amount and type of light. Standard lighting units typically utilize a fluorescent or metal halide bulb that produces light at a specific spectrum and intensity. These lights may be hung above the habitat or be part of a hood or other unit which connects directly to the habitat. Typical lighting units are designed to provide light sufficient to permit a user to observe the habitat.

SUMMARY

In accordance with an aspect of the invention, a lighting unit includes a housing, an emitter assembly, and a fan assembly. The emitter assembly is at least partially received in the housing. The emitter assembly includes a light emitter. The fan assembly is also at least partially received in the housing. The fan assembly includes a fan blade for generating airflow and a curved baffle situated over the fan blade for directing the airflow.

Another aspect provides a lighting unit including a core, first and second emitter assemblies and a fan. The core includes a first outer region, a second outer region, and an interior region disposed between the first outer region and the second outer region. The interior region includes an opening and a heat sink for dissipating heat. The first emitter assembly is connected to the core and includes a first light emitter device. The second emitter assembly is connected to the core and includes a second light emitter device. The fan generates airflow through the opening that removes heat dissipated by the heat sink.

Another aspect provides a lighting unit including a housing, a light emitter, a USB port, and internal memory. The light emitter is contained in the housing. The USB port connects the lighting unit to a computer. The internal memory stores information received from the computer.

In accordance with a further aspect, a method of controlling a lighting unit includes monitoring temperature information at a first location in the lighting unit. The temperature information is relayed to a circuit that is operably connected to a fan assembly and an emitter assembly. It is determined if a first temperature threshold has been crossed. If the first temperature threshold has been crossed, at least one of a reduction in light intensity or an increase in fan speed is performed.

A further aspect includes a method of controlling the environmental conditions of a habitat. An operating mode is selected having associated data related to light intensity and light color. The associated data is transmitted to a lighting unit. The associated data is stored in the lighting unit. The operating parameters of the lighting unit are adjusted to correspond to the associated data.

Other embodiments, including apparatus, systems, assemblies, methods, and the like which constitute part of the invention, will become more apparent upon reading the following detailed description of the exemplary embodiments and viewing the drawings. It is to be understood that both the foregoing general description and the following detailed description are exemplary and explanatory only and therefore not necessarily restrictive.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention.

FIG. 1A is a perspective view of an aquatic habitat equipped with a lighting unit according to an exemplary embodiment.

FIG. 1B is a perspective view of an aquatic habitat equipped with the exemplary lighting unit of FIG. 11.

FIG. 2 is a perspective view of a lighting unit according to an exemplary embodiment.

FIG. 5 is a perspective view of an exemplary end cap of the housing of the lighting unit of FIGS. 2 and 3.

FIG. 6 is a top view of the lighting unit core and the fan assembly of the lighting unit of FIG. 2.

FIG. 7 is a top perspective view of the lighting unit core and fan assembly of FIG. 6.

FIG. 8A is a top perspective, exploded view of the fan assembly according to an exemplary embodiment.

FIG. 8B is a bottom perspective, exploded view of the fan assembly of FIG. 8A.

FIG. 9 is a bottom view of internal components of a lighting unit according to an exemplary embodiment.

FIG. 10 is a perspective, exploded view of one of the emitter assemblies of the light assembly of FIG. 8.

DETAILED DESCRIPTION OF EXEMPLARY EMBODIMENT(S) AND EXEMPLARY METHOD(S)

Figure 3:
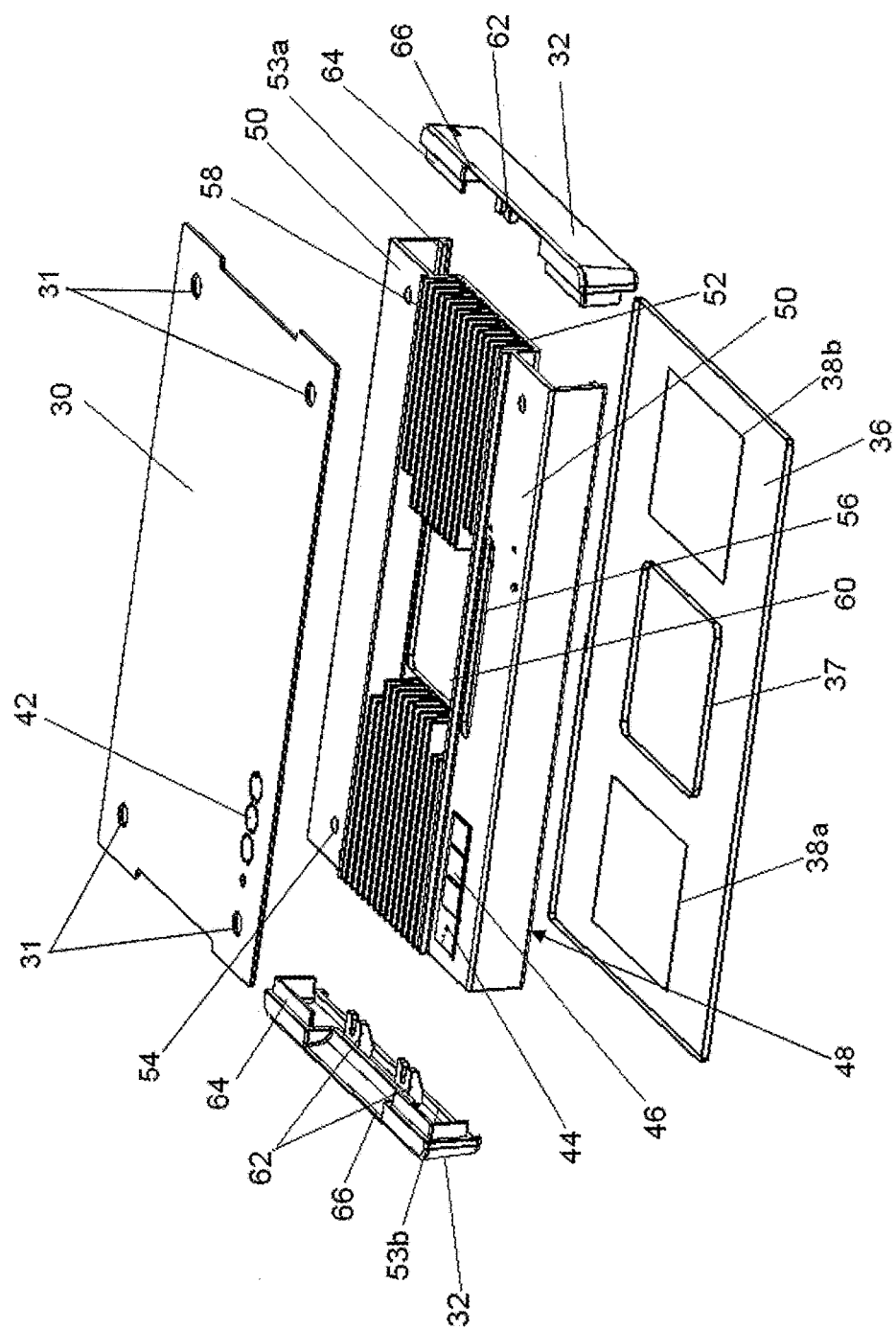
FIG. 3 is a perspective, exploded view of the core and housing of the lighting unit of FIG. 2.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

FIG. 1A depicts a lighting unit 10, for use with a habitat 12. In an exemplary embodiment, the habitat 12 is an aquatic habitat such as a marine aquarium, though aspects of the invention may extend to other embodiments using non-aquatic habitats. The habitat 12 has a pair of opposite side walls 14a, 14b spaced apart from one another and a pair of spaced end walls 16a, 16b extending between opposite side edges of the side walls 14a, 14b. The habitat 12 has a bottom 18, and an open top 20. Although not shown, a cover may be placed over all or a portion of the open top 20. The cover may be either integral with or connected to the habitat 12. The cover may be transparent or provided with openings, such as a screen or grate. Though depicted as having a standard rectangular shape, the habitat 12 may have different sizes, shapes, and configurations while including any number of walls. The walls may be flat as shown, or they may be curved. The walls of the habitat 12 may be made from a variety of materials, including glass or a high-strength acrylic.

Components, such as pumps, fans, filters, etc., may be attached to or used in connection with the habitat 12 to alter or control the environment therein. Depending on the organisms living in the habitat 12, different components will be appropriate. In the exemplary embodiment illustrated in FIG. 1, the habitat 12 includes a set of pumps 22, with a pump 22 located on each of the side walls 14a, 14b and each of the end walls 16a 16b in the illustrated embodiment. The habitat 12 may also include a filter 24 and a heater 26. These components may collectively affect specific environmental conditions to the habitat 12. For example, the pumps 22 can create different flow types to mimic natural tides and the lighting unit 10 can follow a day and night cycle. In order to create a close approximation of a natural environment, the lighting unit 10 possess the capability of providing diverse outputs such as different light intensities, different light patterns, different light colors, etc.

FIGS. 2 and 3 depict exemplary components of the lighting unit 10, which includes a housing 28 constructed from a top plate 30, a pair of end caps 32, a pair of side walls 34, and a bottom cover 36. The housing 28 may be designed to totally encase portions of the lighting unit 10 or to leave certain gaps and spaces. The housing 28 elements may be connected to each other and/or to a core component by suitable mechanical fasteners, such as screws or clips, or with adhesives.

The top plate 30 may be made from a polymer, metal, composite, or other suitable material. In an exemplary embodiment the top plate 30 is made from a fiberglass-reinforced polymer that may be powder coated and etched to provide a desired color and design. The top plate 30 may also be made from an acrylic material that is painted or etched. The top plate 30 may have openings such as holes 31 for receiving fasteners 39 as show in FIG. 2. The fasteners 39 connect the top plate 30 to other components in the lighting unit 10, for example a core 48 as discussed in further detail below. The end caps 32 may be made from a polymer or metal material and include mechanical fasteners for connecting to the lighting unit 10 as discussed in further detail below. The bottom cover 36 may be made from glass, an acrylic polymer, or other transparent materials as well as non-transparent materials including metals and polymers. The bottom cover 36 may include openings, for example a center opening 37 and a first and second side openings 38a, 38b on opposite sides of the center opening 37. The openings 37, 38a, 38b may be used to allow various components to extend through the housing 28 and communicate with the atmosphere outside of the housing 28. Various embodiments may include more openings or fewer openings depending on the operating parameters of the lighting unit 10.

As best shown in FIG. 1A, a suspension assembly 40a may be connected to the housing 28 to suspend the lighting unit 10 over the habitat 12. The suspension assembly 40 may include wires or cords which attach to the top plate 30. For example, a wire may attach to each of the fasteners 39 and then connect to a post or cord which is hung from a ceiling or connected to a wall bracket.

As best shown in FIG. 1B, a suspension assembly 40b may be connected to the housing 28 to suspend a lighting unit 110 over the habitat 12. The suspension assembly 40b includes a set of brackets 41. The brackets 41 may connect to the lighting unit 110 through a set of wires or cords which attach to the top plate 30. For example, a wire may attach to each of the fasteners 39. In various exemplary embodiments, the suspension assemblies 40a, 40b may also include other supports, brackets, posts, struts, legs, clips, or additional mechanical components which attach the top plate 30, end caps 32, side walls 34, bottom cover 36, or any combination thereof to a ceiling, wall, or to a component of the habitat 12, such as the side walls 14a, 14b, the end walls 16a, 16b, the bottom 18, or the top 20.

A user interface 42 may be incorporated into the top plate 30 as depicted in FIGS. 2 and 3. The user interface 42 may include a set of input buttons, indicator lights, a display screen such as a touch screen, or any combination therefore. Other audio, visual, tactile, input, and output devices also may be associated with the user interface 42 as would be understood by one of ordinary skill in the art upon viewing this disclosure.

In the exemplary embodiment shown in FIG. 3, the user interface 42 includes a panel 44 located beneath the top plate 30. The panel 44 may be a printed circuit board and include various electrical components 46 associated with the user interface 42, such as capacitive sensing devices, pressure sensing devices, light emitting diodes (LEDs), processors, piezoelectric devices, or any combination thereof. The electrical components 46 will vary depending on the functions of the user interface 42 and the lighting unit 10. In various exemplary embodiments, a piezoelectric device may be associated with the user interface 42 and configured to emit vibrations to provide tactile feedback to communicate any number of instructions or status information to a user. Tactile feedback may be provided to a user, for example, when a button has been pressed or to alert a user that there is an error in the programming input. A thermal pad may be placed underneath the electrical components 46 so as to space the electrical components 46 from other components in the lighting unit 10. The thermal pad limits the amount of heat transferred to and from the electrical components 46 and the rest of the lighting unit 10. The thermal pad may be made from a polymeric, elastomeric, or a cellulosic material. The thermal pad may also be resilient to provide cushion and prevent damage to the electrical components 46.

In addition to providing operating information, the user interface 42 may allow a user to set and control conditions pertaining to the lighting unit 10. This may include allowing a user to change the light color, change the light intensity, and select different operating modes. Different operating modes may include different light patterns and intensities, that are either set or vary over time. The operating modes may be preprogrammed and preloaded, downloaded, and programmed by a user. Examples of different operating modes that may be selected include night, sunrise, day, sunset, lunar colors, storms, and solar cycles.

As best shown in FIGS. 2 and 3, the user interface 42 includes a first button 43a, a second button 43b, and a third button 43c. Though various exemplary embodiments utilize buttons 43a-43c as shown, other input methods such as a touch-screen panel, switches, keys, or other devices may be utilized. More or less buttons 43a-43c may also be used. Different buttons 43a-43c, either individually or in combination, may perform different functions. For example, the first button 43a may reduce the light intensity, the second button 43b may increase the light intensity, the third button 43c may change the color of the light output, and a combination of the first button 43a and the second button 43b may cycle through different operating modes.

The lighting unit 10 may also be programmed so that different gestures or combinations of activated buttons 43a-43c select a specific operating mode or perform a certain set of instructions. Gestures may include swiping a finger across all or a limited number of buttons 43a-43c on the user interface 42 in a single direction or in any combination of directions. For example, the user interface 42 may include capacitive sensors and be programmed so that when a user swipes a finger across the user interface 42 from left to right, activating all the buttons 43a-43c, the lighting unit 10 goes into a certain operational mode, such as sunrise mode. Gestures may be combined with each other or with pressing one or more buttons to provide a greater number of accessible programmed operating modes. For example, swiping a finger across the interface 42 from left to right and then pressing button 43c may activate a sunset mode.

In an exemplary embodiment, the lighting unit 10 is capable of communicating with and directing other components of the habitat 12, for example, pumps 22 or additional lighting units 10. In such instances, commands input to the lighting unit 10 by the user may be relayed to other components. Communication between the lighting unit 10 and other components may be facilitated by a Wi-Fi device, radio module, or other wireless communication device. When a user selects or gestures for a specific operating mode, the lighting unit 10 and the pumps 22 may both adjust their operating parameters to that specific mode. This may be utilized to coordinate specific light outputs with specific flow patterns and temperatures. For example, a certain light intensity and color may be associated with a pump 22 operation that produces calm water flow to provide optimized feeding conditions for various organisms in the habitat 12. Other components, such as the filter 24 and the heater 26, may be controlled or adjusted in this manner.

Different button selections, including single button selections, button combinations, and gestures, may be also customized by a user. A user may input programming features directly to the lighting unit 10 through the user interface 42 or programming features may be input to a separate device that communicates with the lighting unit 10. For example, a user may create a customized feature for a particular gesture on a remote control unit, a computer, or a smart phone. Instructions will then be sent by the device to the lighting unit 10, either wirelessly or through a physical connection, such as a USB connection (not shown). Additionally, software may be provided and allow a user to create different operating parameters as discussed in greater detail with respect to FIGS. 17 and 18.

Figure 4:
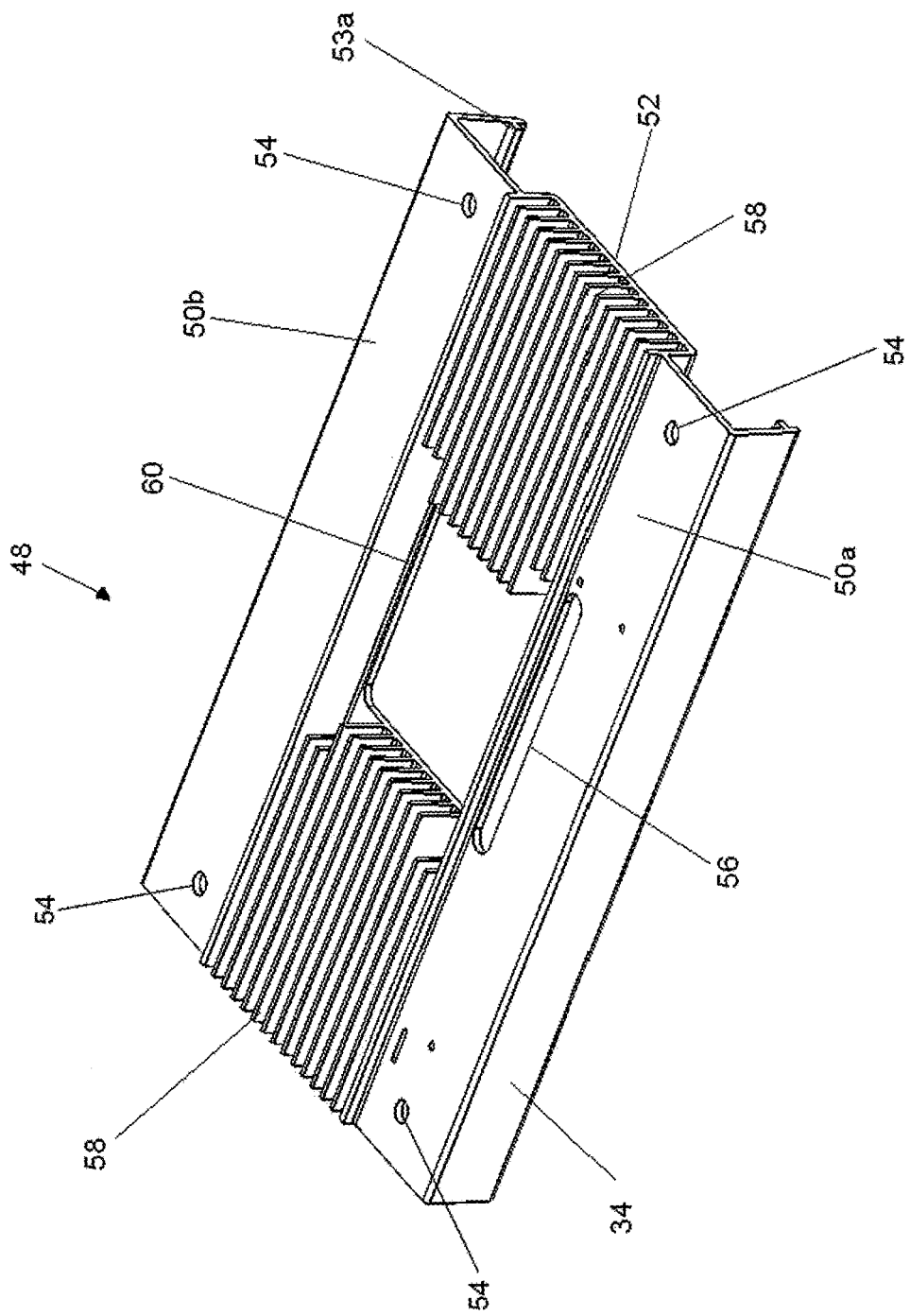
FIG. 4 is a perspective view of the lighting unit core of FIG. 3.
Figure 11:
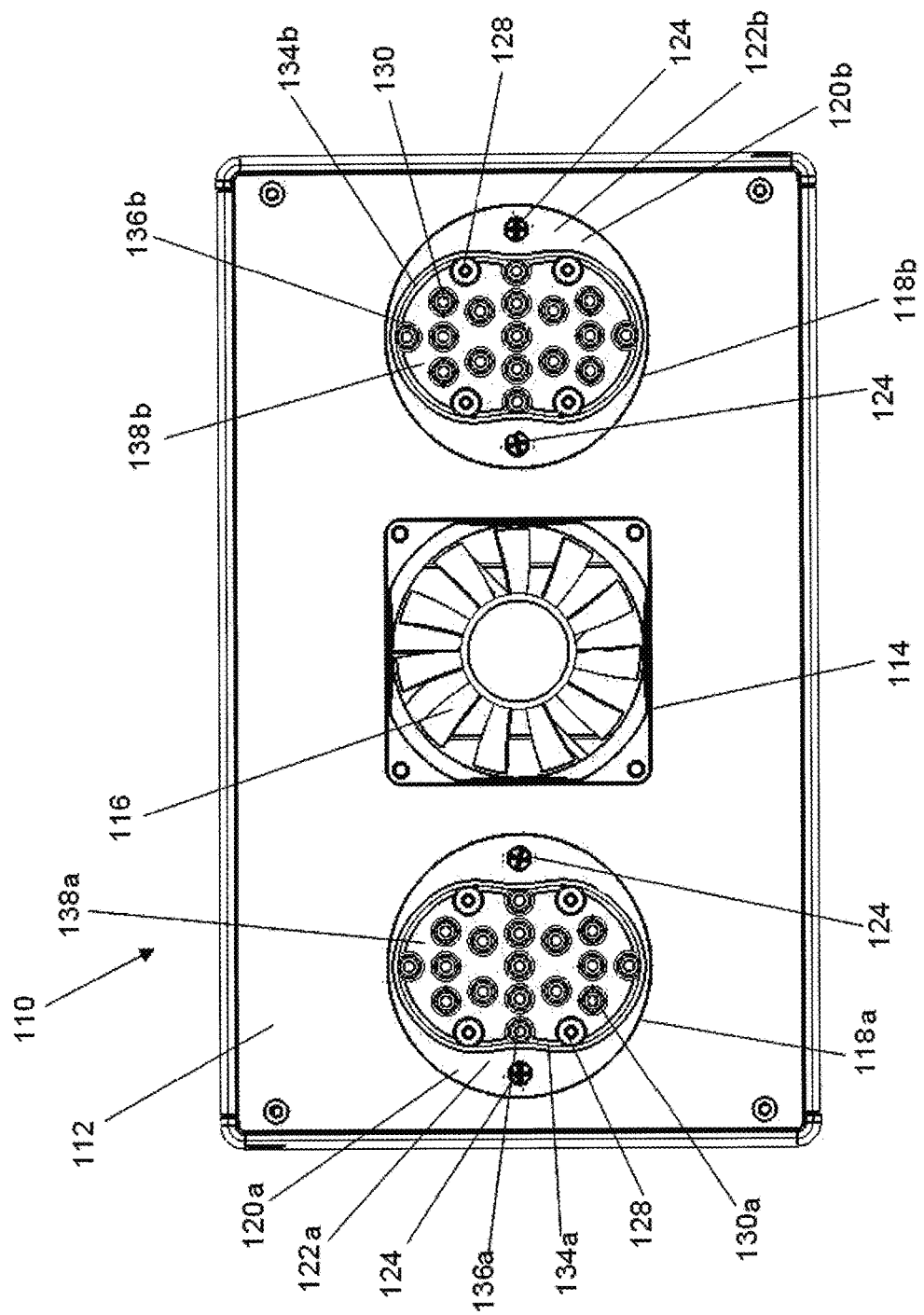
FIG. 11 is a bottom view of an alternative exemplary lighting unit.
Figure 12:
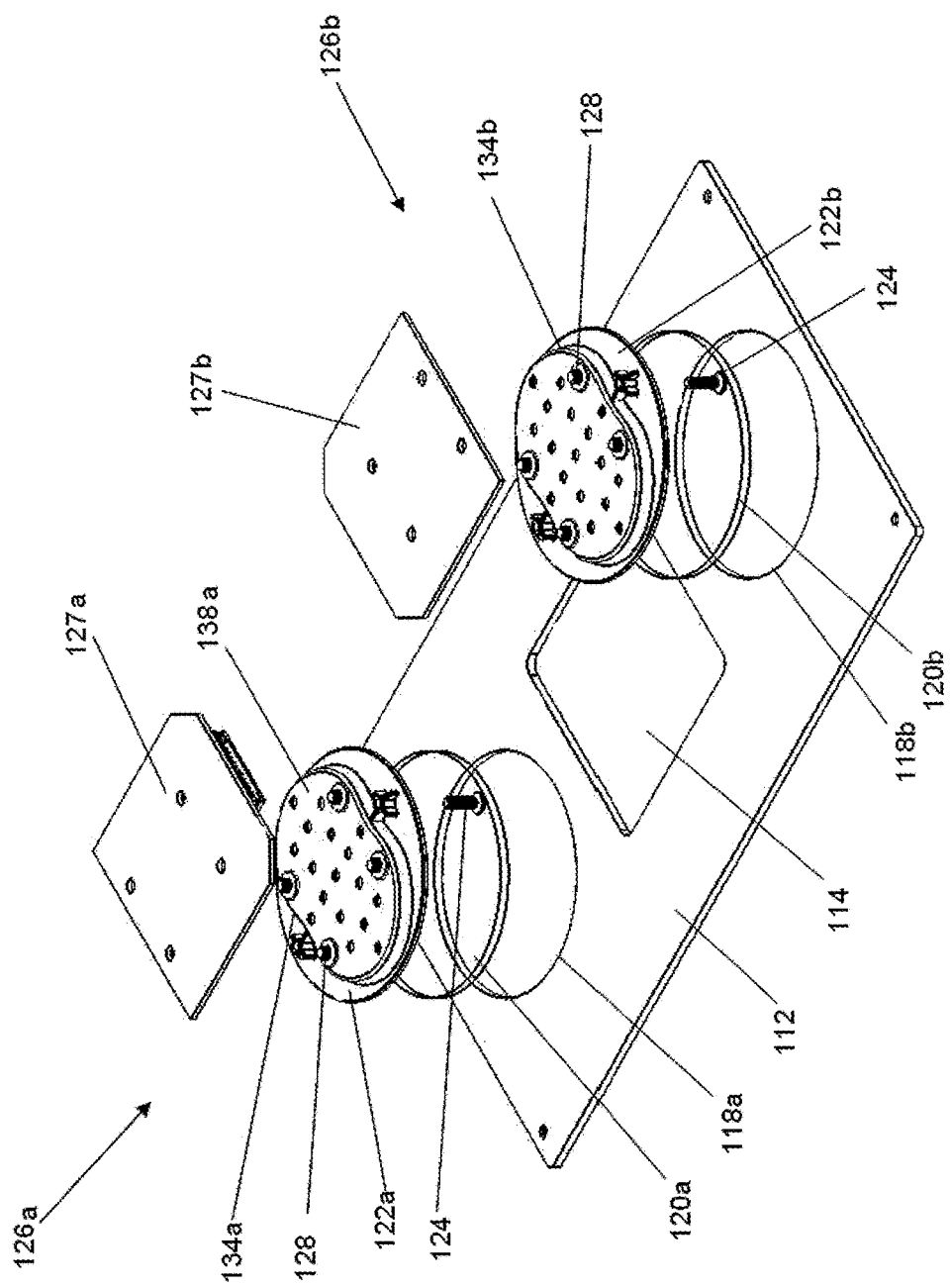
FIG. 12 is a perspective, exploded view of portions of the exemplary lighting unit of FIG. 11.
Figure 13:
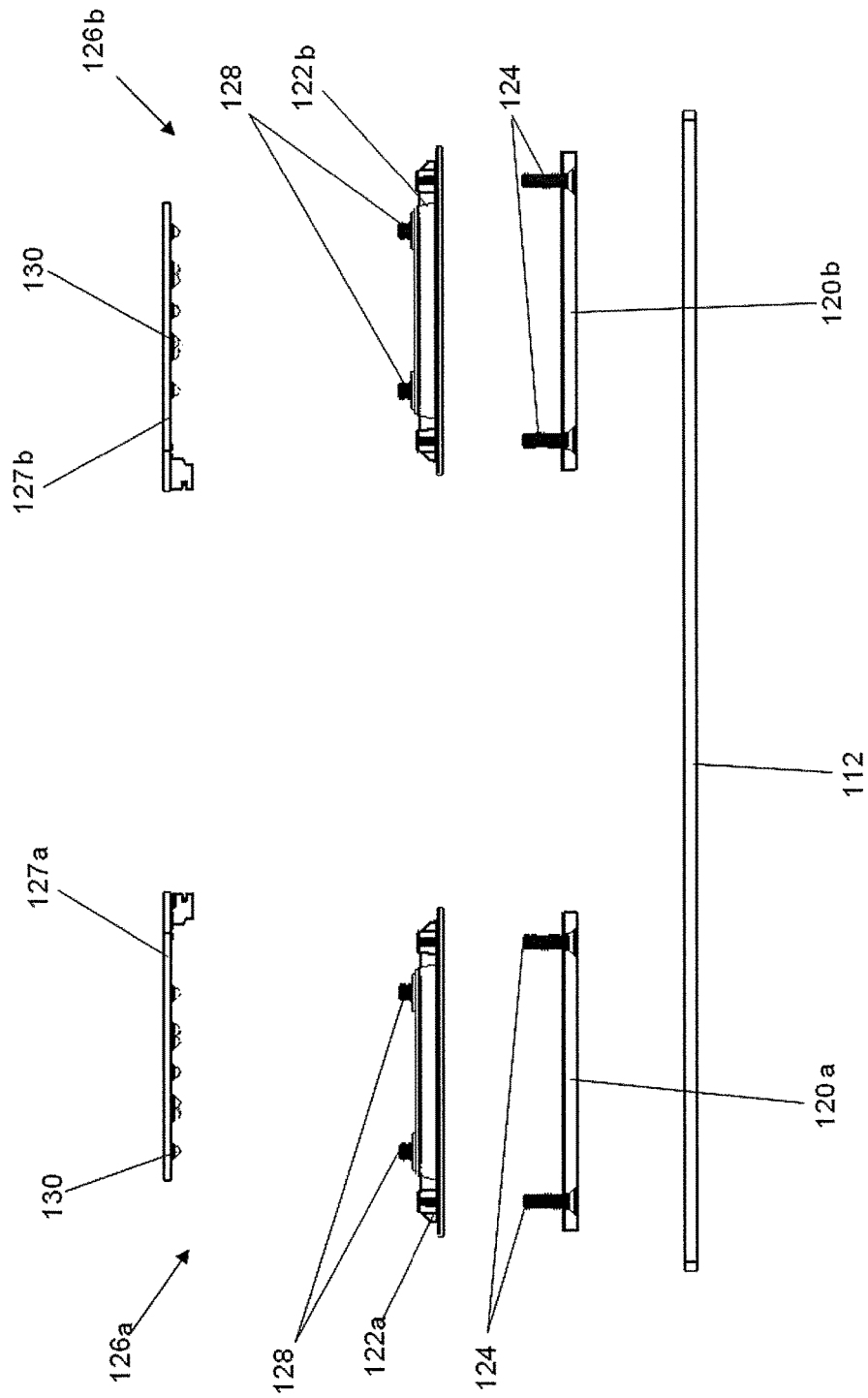
FIG. 13 is a front view of FIG. 12.

The exemplary embodiment of FIGS. 3 and 4 shows a core 48 of the lighting unit 20. The side walls 34 of the housing 28 may be connected to or formed integral with the core 48 or they may be separate from the core 48 and connect independently to other components in the housing 28. The core 48 includes a first side region 50a, a second side region 50b, and an inner region 52. The core 48 may be made from, for example, a metallic, polymer, ceramic, or composite material. In an exemplary embodiment, the core 48 is an extruded piece of aluminum or a thermally conductive polymer.

The side regions 50a, 50b may have a substantially planar top surface portion and be substantially perpendicular to the side walls 34 to provide an L-shaped channel. This channel may contain a rib 53a which aligns with a similar rib 53b on the end caps 32. The two sets of ribs 53a, 53b provide a ledge which assists in positioning and retaining the bottom cover 36. The side regions 50 may also include a number of holes 54 for connecting the top plate 30 to the core 48 using fasteners 39. A side region 50a, 50b may also include a slot 56 which provides space for various components to attach to and extend through the core 48. Other holes, slots, and openings may be provided in the core 48 depending on the layout and design of the lighting unit 10.

As best shown in the exemplary embodiment depicted in FIGS. 3 and 4, the side regions 50a, 50b are located on opposite sides of a single inner region 52. Varying numbers of side regions 50a, 50b and inner regions 52 may be utilized. Moreover, the outer planar areas are referred to as side regions 50a, 50b for simplicity and clarity to describe the shown exemplary embodiments, but need not be located on the periphery of the core 48. Similarly, the inner region 52 may be spaced in any location, central to a pair of side regions 50a, 50b or otherwise.

The inner region 52 may be on a plane spaced vertically below the side regions 50a, 50b. The inner region 52 may include a heat sink for cooling the lighting unit 10. The heat sink may include, for example, a series of fins 58. The fins 58 may be formed integrally with and extend upwardly from the bottom planar surface of the inner region 52 or attached thereto. The fins 58 may extend substantially parallel to one another to permit airflow therebetween. While the figures show various exemplary embodiments utilizing fins 58, any manner or design of a heat sink or heat exchanger may be used in place of, or in combination with, the fins 58 to dissipate heat. The inner region 52 may also be provided with an opening 60 for allowing various components attached to the core 48 to extend through the inner region 52. The opening 60 may separate the inner region 52 into first and second sections as best shown in FIG. 4. A number of heat fins 58 may extend across opposite sides of the opening 60, connecting the first and second sections of the inner region 52. Depending on the desired functions of the lighting unit 10, multiple openings 60 may be provided and the inner portion 52 may be separated into any number of sections.

As best shown in the exemplary embodiment depicted in FIG. 5, the end caps 32 include brackets 62 for attaching the end caps 32 to the core 48. A fastener (not shown) may be placed or threaded through the bottom of the bracket 62 and into a hole in the inner region 52 to secure the attachment. In various exemplary embodiments the end caps 32 may be connected to the core 48, housing 28, or other components of the lighting unit 10 in a variety of ways, including other forms of mechanical fasteners and/or adhesives. Tabs 64 are also provided on the end caps 32 to help align the end caps 32 with the core 48. As best shown in FIG. 5, the tabs 64 may have an L-shaped configuration. Each of the end caps 32 includes a passage 66. When the end caps 32 are connected to the core 48, the passages 66 align with the inner region 52 and the fins 58. The passages 66 create an opening which allows air to freely circulate between the fins 58 and the outside of the housing 28. The passages 66 may be sized to have a width and height substantially equal to the array of fins 58, though smaller or larger passages 66 may also be used. As best shown in FIG. 5, the passages 66 include a curved wall 67. The curved wall 67 reduces turbulence, promoting laminar air flow through the passage 66. This reduction in turbulence results in quieter operation and reduced vibrations.

FIGS. 6 and 7 depict an exemplary embodiment of the lighting unit 10 having a fan assembly 70 positioned in the opening 60 and FIGS. 8A and 8B depict an exemplary embodiment of the fan assembly 70 independent from the remainder of the lighting unit 10. The fan assembly 70 includes a hood 72, a blade housing 78, a set of fan blades 80, and a grate 82.

The hood 72 includes a set of flanges 73a-73d. Though four flanges 73 are depicted in the figures, fewer or more flanges 73 may be used. Each flange 73a-73d has an outer hole 75a and an inner hole 75b. The outer and inner holes 75a, 75b assist in connecting the hood 72 to the core 48 and to other components in the fan assembly 70, for example via mechanical fasteners. In an exemplary embodiment, the outer holes 75a facilitate a connection to the core 48 while the inner holes 75b facilitate a connection to the blade housing 78.

As best shown in FIGS. 8A and 8B, the hood 72 includes a spine 74 and a pair of baffles 76. The baffles 76 may be curved and meet at the spine 74 to form a V-shaped cross section. The fan assembly 70 may be operated to draw air in through the recessed portions 66 and fins 58, through the hood 72, and out through the grate 82 or it may be operated to draw air in through the grate 80, through the hood 72, and out through the fins 58 and passages 66. When air is drawn in through the grate 82, air entering the hood 72 is separated by the spine 74 so that the air flow rate is approximately symmetric as it moves in both directions along the baffles 76. In an exemplary embodiment, the baffles 76 are designed to direct the air flow to the fins 58 while maintaining the momentum of the air flow through the fan assembly 70, reducing or eliminating the amount of turbulence. After passing through the fins 58, the air may then flow out of opposite ends of the housing 28 through the passages 66 of the end caps 32. While a two-directional hood 72 having two baffles 76 is shown in the exemplary embodiment of FIGS. 6-9, the number of baffles 76 may vary depending on the design of the lighting unit 10 and the fan assembly 70.

The baffles 76 of the hood 72 allow air to flow more efficiently through the housing 28. The efficient air flow reduces noise and vibration and also provides a greater cooling effect, allowing for the use of more advanced electronics, greater light intensities, and/or more lighting elements in a smaller space. Additionally, the greater cooling effect allows for a smaller fan assembly 70 or allows the fan assembly 70 to operate at a slower speed, both of which reduce noise, vibrations, and energy usage. In an exemplary embodiment, the baffles 76 are designed to maintain substantially laminar air flow through the fan assembly 70 to further increase efficiency and reduce noise.

As best shown in FIGS. 8A and 8B, the blade housing 78 contains a hub 79 and a set of blades 80. The blade housing 78 may be a unitary structure or be composed of multiple pieces. The blade housing 78 may include an axle (not shown) on which the hub 79 rotates. The blades 80 may be formed integrally with the hub 79 or otherwise connected thereto. In an exemplary embodiment, the blades 80 are impeller blades. The blades 80 may be designed so that the fan assembly 70 operates as an axial flow impeller, drawing air from underneath the fan assembly 70, for example through the grate 82. The blades 80 may also be designed so that air is drawn through the housing and exhausted out of the grate 82. Other types of blades 80, including radial flow and mix flow propellers or impellers may also be used.

In an exemplary embodiment, the grate 82 attaches to the blade housing 78 through the center opening 37 of the bottom cover 36. The grate 82 helps prevent objects, organisms housed in the habitat 12, or a user from coming in contact with the blades 80 of the fan assembly 70. In an exemplary embodiment, the grate 82 is attached to the lighting unit 10 in a manner which holds the bottom cover 36 in place, for example against the ribs 53a on the core 48 and against ribs 53b on the endcaps. In various exemplary embodiments, the grate 82 may be omitted and the bottom cover 36 may be attached to the core 48 through mechanical fasteners.

FIGS. 9 and 10 depict an exemplary embodiment of emitter assemblies 86a, 86b used in connection with the lighting unit 10. The emitter assemblies 86a, 86b may attach to the core 48, for example underneath the inner region 52. Attachment of the emitter assemblies 86a, 86b vary depending on the overall design and materials used and may be, for example, achieved using mechanical fasteners, adhesives, soldering, welding, etc. In various exemplary embodiments, the fins 58 extend at least partially over the emitter assemblies 86a, 86b. Placing the fins 58 directly over the emitter assemblies 86a, 86b helps to effectively transfer heat from the emitter assemblies 86a, 86b to the atmosphere. The emitter assemblies 86a, 86b utilize any number of light emitters 90, which may be placed in a variety of groupings and spacing patterns. Though only two emitter assemblies 86a, 86b are shown, any number may be utilized depending on the design of the lighting unit 10. In various exemplary embodiments, the number of emitter assemblies 86a, 86b equals the number of interior regions 52 and the number of baffles 76.

As best shown in FIG. 10, the exemplary emitter assembly 86a includes a top panel 88, an insulator 96, and a reflector 98. The top panel 88 may be a printed circuit board (PCB), for example an aluminum clad PCB. An array of light emitters 90 and a terminal block 94 may be mounted on or otherwise connected to the top panel 88. In an exemplary embodiment, the light emitters 90 are LEDs, though a variety of light sources may be utilized, including the use of different types of light emitters 90 in the same array. Each light emitter 90 may be capable of emitting light over a range of intensities and wavelengths, or different light emitters 90 can have a dedicated wavelength or intensity. In an exemplary embodiment, groups of light emitters 90 have a range of wavelengths that is different or slightly overlaps with other groups of light emitters 90. For example, light emitters 90 may be separated into different color groups of white, red, green, blue, royal blue, violet, and/or ultraviolet.

The wavelength of the light emitters 90 of each group may be varied to produce different shades and intensities of each color. Each color group may be separated into individual channels and controlled separately.

The light emitters 90 are electrically connected to the circuit board 92 and to the terminal block 94. In an exemplary embodiment, each color group is on a single channel, so that the light emitters 90 are group controlled though individual control may also be employed. In various exemplary embodiments, the lighting unit 10 may utilize six or more channels to control the light emitters 90, though any number of channels (one or more) may be utilized depending on the configuration. The circuit board 92 may contain various electrical components, the type and number of which will depend on the type of light emitters 90 used and the desired operating parameters and capabilities for the light emitters 90 as would be understood by one of ordinary skill in the art.

The insulator 96 may be made from an assortment of materials, including a polymer, elastomeric, ceramic, or paper material. The insulator 96 can inhibit the amount of heat transferred to the reflector 98, and thus direct most of the generated heat to the core 48 and to the fins 58. The insulator 96 may also protect the top panel 88 and the light emitters 90 from unwanted contact with the reflector 98.

The reflector 98 may be made from a metallic, ceramic, polymer, or composite material. In an exemplary embodiment the reflector 98 is made from molded plastic and plated with aluminum. In the embodiment shown in the figures, the reflector 98 extends through the side openings 38 in the bottom cover 36 and directs light from the light assembly 86 to the habitat 12. In various other embodiments, the reflector 98 may be contained completely in the housing 28 and the light may be directed through the transparent bottom cover 36. The reflector 98 may have various shapes and sizes depending on the requirements of the habitat 12.

As best shown in FIG. 9, the light assemblies 86 are connected to a circuit board 100 through a series of wires 102. The ends of wires 102 are attached to PCB connectors 104 which plug into the terminal blocks 94. The wires 102 may be at least partially surrounded and held in place by a wire harness 106. The circuit board 100 may be connected to the user interface 42 and the fan assembly 70 in a similar manner. The circuit board 100 may attach to the bottom of a side region 50 of the core 48, for example, using mechanical fasteners. The slot 56 in the outer region 50 allows various components associated with the circuit board 100 to extend through the core 48 as needed. The circuit board 100 may contain one or more microcontrollers or microprocessors for receiving and processing data and providing an output to control the various components of the lighting unit 10. The microprocessor may have or be associated with memory for storing received data. The circuit board 100 may contain a variety of electrical components, which may include resistors, transistors, capacitors, microcontrollers, processors, clock generators, or microchips depending on the desired operation of the lighting unit 10 as would be understood by one of ordinary skill in the art.

The microprocessor may be connected to a driver that controls the output of the light emitters 90, for example by varying the wavelength and intensity of individual or groups of light emitters 90, by cycling on and off individual or groups of light emitters 90, or through a combination of both. This allows the lighting unit 10 to provide different lighting characteristics and patterns to the habitat 12. For example, the driver can vary the intensity of the light emitters 90, or a group of light emitters 90, over the course of 24 hours to mimic a day-and-night cycle. A day-and-night cycle effect may also be achieved by varying the color of the light emitters 90, depending on the types of emitters used. The driver may also control the light emitters 90 to dim, brighten, or selectively turn on and off individual light emitters 90, depending upon the wavelength of light. In this manner, the overall light color emitted by the lighting unit 10 may be controlled to promote the growth and health of specific organisms in the habitat 12, such as plants, coral or anemones. More than one driver may be employed depending on the size of the lighting unit 10, the number of emitter assemblies 86a, 86b, and the desired functionality of each emitter assembly 86a, 86b, and the desired independent operation of each emitter assembly 86. A thermal pad or pads (not shown) may be placed between the driver and other components of the lighting unit 10 to affect the amount of heat transferred to and from the driver.

In an exemplary embodiment the microprocessor is capable of controlling the fan assembly 70, for example, in a similar manner employed with the emitter assemblies 86a, 86b. The fan assembly 70 may be connected to a driver or other similar control circuit, for example, either to the same driver as the emitter assemblies 86a, 86b or to a separate driver. The fan assembly 70 may be controlled by varying the speed of the fan blade 80 and by cycling the fan blade 80 on and off. The lighting unit 10 may also have the capability to measure the internal and external temperature of the lighting unit 10 at specific points. Devices for measuring the temperature may include resistive temperature detectors, thermistors, thermocouples, and silicone integrated circuit temperature sensors (not shown). The temperature measuring devices may be placed in the lighting unit 10 and their output may be sent to a component of the circuit board 100, such as the microprocessor or to a dedicated device such as a microcontroller. For example, thermistors may be connected to the top panel 88 of the emitter assemblies 86. Temperature information may then be relayed to a microprocessor, for example, through wires 102. Based on the output from the thermistors the microprocessor controls both the light emitters 90 and the fan assembly 70 to keep operating temperatures at or below a set value. If an excessive temperature is detected, the microprocessor may raise the fan speed, dim the light emitters 90, turn off a number of light emitters 90 or an entire emitter assembly 86a, or any combination thereof. The lighting unit 10 may also be capable of alerting a user when an excessive temperature is detected. Alerts may be through an audio or visual signal emitted from the lighting unit 10 or alerts may be sent to a remote device or location such as a computer or a users phone, example through a radio or wireless signal.

In an exemplary embodiment, the lighting unit 10 may be provided with a backup battery (not shown). The backup battery may automatically supply power to the lighting unit in the event that another power source, such as a primary battery or outlet power, fails. In the event that the backup battery is activated, the microprocessor may turn off the light emitters 90 or lower the light output to a minimal level so that the battery power may be conserved. Operation of the fan assembly 70 may similarly be discontinued or adjusted. Minimal light and fan speed levels may be pre-programmed or manually set by the user.

The minimal level of light may vary depending on the species in the habitat 12. For example, when the habitat 12 contains plants, the minimal level of light may be sufficient to sustain photosynthesis. As would be understood by one of ordinary skill in the art, the minimal light intensity to sustain photosynthesis depends on the type of plant or plants. The minimal level of light also depends on the conditions of the habitat which may affect the light transferred from the lighting unit 10 to the plants. For example, in an aquatic habitat 12, the level of light reaching underwater plants will depend on the clarity of the water and the depth of the plants. In aquatic habitats it may be important to maintain photosynthesis so that oxygen is not drawn from water by the plants, potentially harming other species such as fish. Various devices, such as a Secchi disk or electronic light meter may be utilized to determine the intensity of light reaching the plants in a specific habitat 12. The lighting unit 10 may then be programmed for the appropriate minimal amount of light to sustain photosynthesis for the individual habitat 12.

The microprocessor may also contain or be connected to a communication unit. The communication unit may be a wireless communication module, such as a Wi-Fi module or a proprietary radio module. The communication unit may be capable of receiving commands from a user or centralized controller and instructing the driver to vary or modify the output of the light emitters 86 to create different lighting effects. The communication unit is also capable of communicating with other components of the habitat 12, for example the pumps 22, to provide and receive operating information and to provide and receive monitoring information. In an exemplary embodiment, the communication unit is capable of sending information to a user, such as alerts or status updates, through the Internet or directly to a personal device of a user, such as a remote or a phone.

FIGS. 11-15 depict an alternative exemplary embodiment of the lighting unit 110. The lighting unit 110 includes a bottom cover 112 having a central opening 114 for receiving a fan 116 and a pair of side openings 118a, 118b. The bottom cover 112 may be made from any of the materials described above with respect to the bottom cover 36. In an exemplary embodiment, the bottom cover 112 is opaque and a pair of transparent lenses 120a, 120b are disposed in the side openings 118a, 118b. The transparent lenses 120a, 120b may connect to reflectors 122a, 122b, for example with mechanical fasteners 124. Each reflector 122a, 122b forms a respective emitter assembly 126a, 126b which also includes a printed circuit board 127a, 127b and light emitters 130. The reflectors 122a, 122b may be connected to the printed circuit boards 127a, 127b through mechanical fasteners 128. This configuration allows individual emitter assemblies 126a, 126b to be easily switched in and out of the lighting unit 110.

Figure 14:
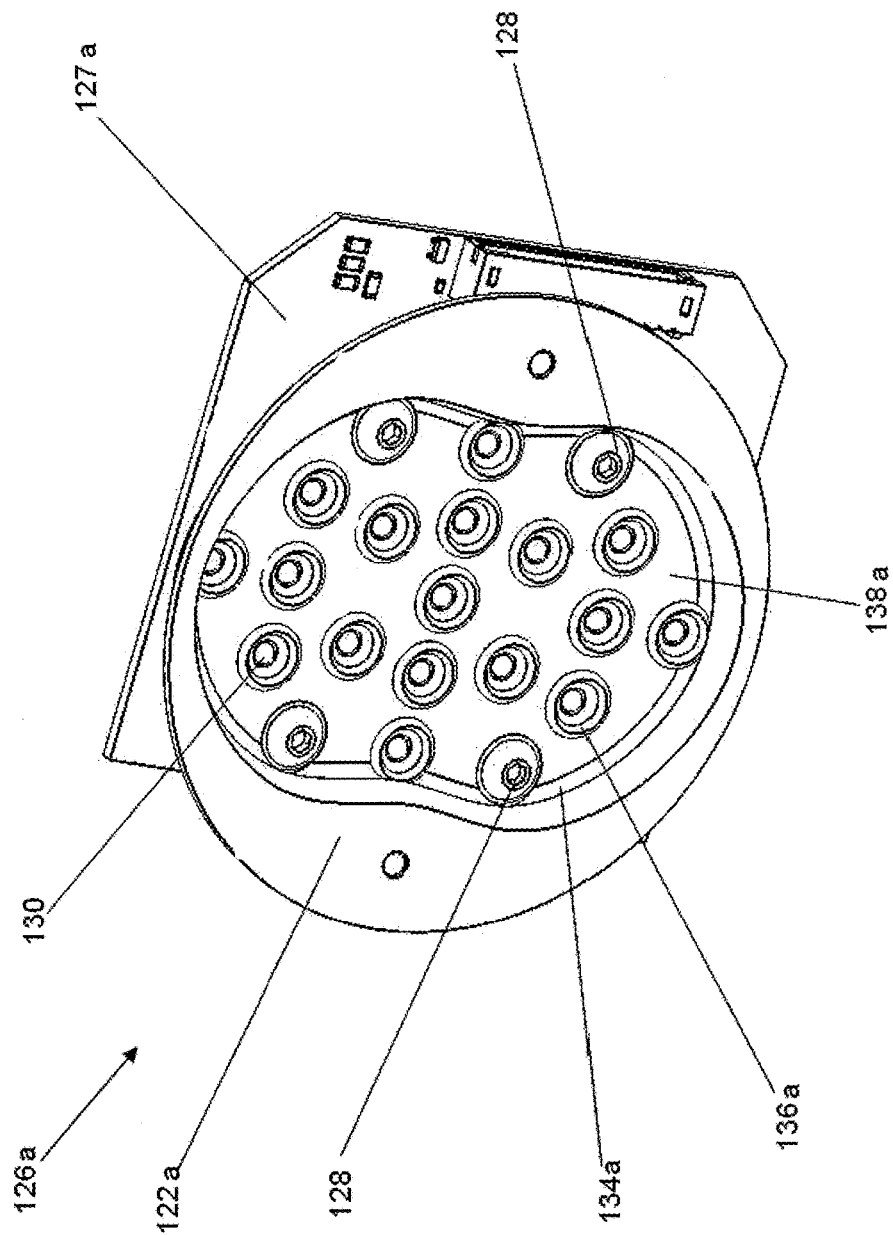
FIG. 14 is a perspective view of one of the emitter assemblies of FIGS. 11-13.

As with the emitter assemblies 86a, 86b discussed above, the emitter assemblies 126a, 126b shown in FIGS. 11-15 may contain an array of light emitters 130 connected to the printed circuit board 127a, 127b. As best shown in FIG. 14, the reflector 122a includes an outer edge 134a having a curved configuration. The reflector 122a also includes individual light guides 136a extending from a base 138a. Each individual light guide 136a surrounds a corresponding light emitter 130. The individual light guides 136a may have a conical configuration with a curved cross section, for example and elliptical cross section. The use of the individual light guides 136a lowers the level at which light from individual light emitters 130 crosses one another, allowing for a more even distribution of light.

Figure 15:
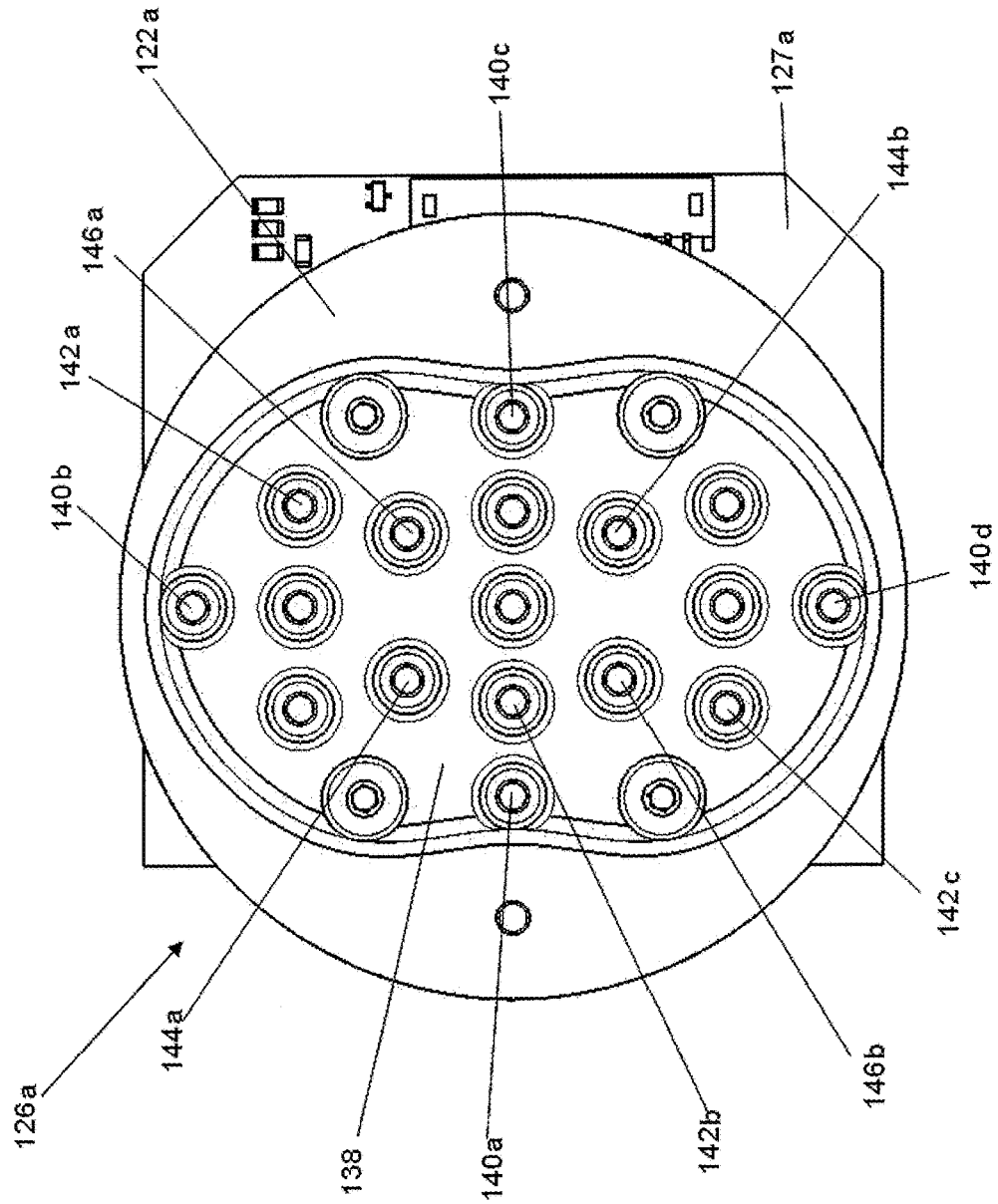
FIG. 15 is a bottom view of FIG. 14.

As best shown in FIG. 15, the light emitters 130 may comprises white LEDs 140a-140d, rows of blue LEDs 142a-142c, green LEDs 144a, 144b, and red LEDs 146a, 146b. This configuration of LEDs along with the reflector 122a more effectively blends the light, creating an even distribution of light and allowing for a wider variety of realistic light patterns. Various patterns and configurations of light emitters 130 may be used depending on the habitat 12 and the inhabitants thereof. The light emitters 130 may also include ultraviolet and violet light. The lighting unit 110 may allow each light emitter 130 to be controlled individually or the colors may be separated into different groups and controlled on different channels.

Figure 16:
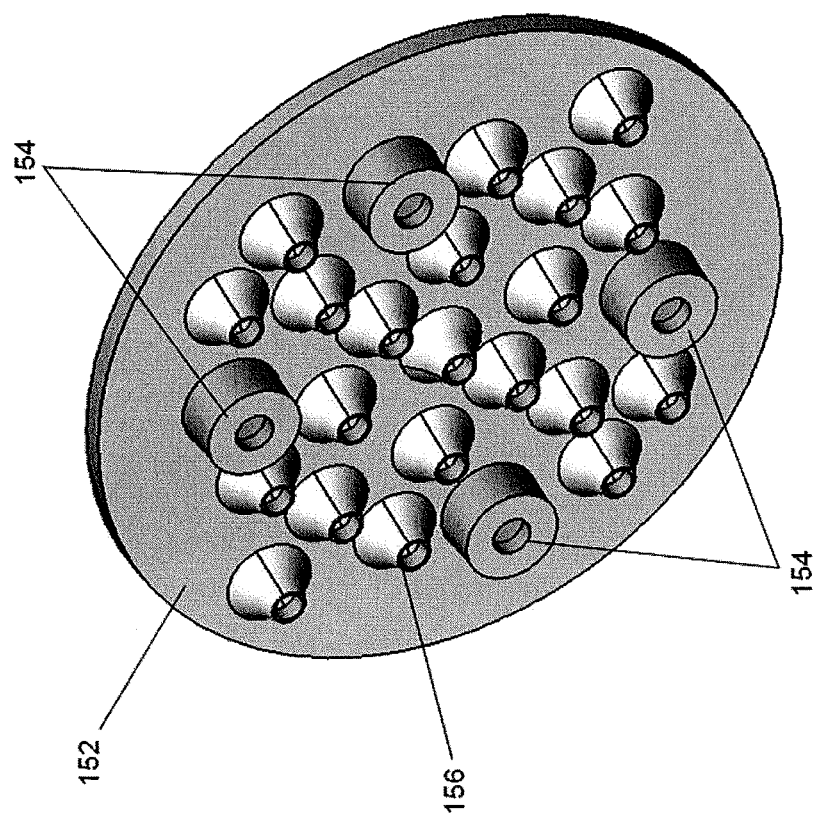
FIG. 16 is a perspective view of a lens assembly.

FIG. 16 depicts an exemplary embodiment of a lens assembly 150 which may be used in place of the reflectors 122a, 122b and the lenses 120a, 120b. The lens assembly 150 includes a base 152, a set of posts 154, and a series of lenses 156. The base 152 may be made from any suitable material, for example, metal or a polymer material. The base 152 may be made from a single piece of material or have a multi-piece construction to provide cover for, and allow access to the posts 154 and the lenses 156. The posts 154 may receive an mechanical fastener (not shown) to attach the base to various components in the lighting unit 110. The lenses 156 may each be associated with a light emitter 130. The lenses may be made from a transparent material for example, a polymer such as acrylic or polycarbonate or glass. In various exemplary embodiments, the lenses 156 are designed to be total internal reflection (TIR) lenses. The TIR lenses provide a greater spread of light at a higher intensity over a greater depth. When used in connection with an aquatic habitat 12, this allows a greater intensity of light to reach further into the habitat 12.

Figure 17:
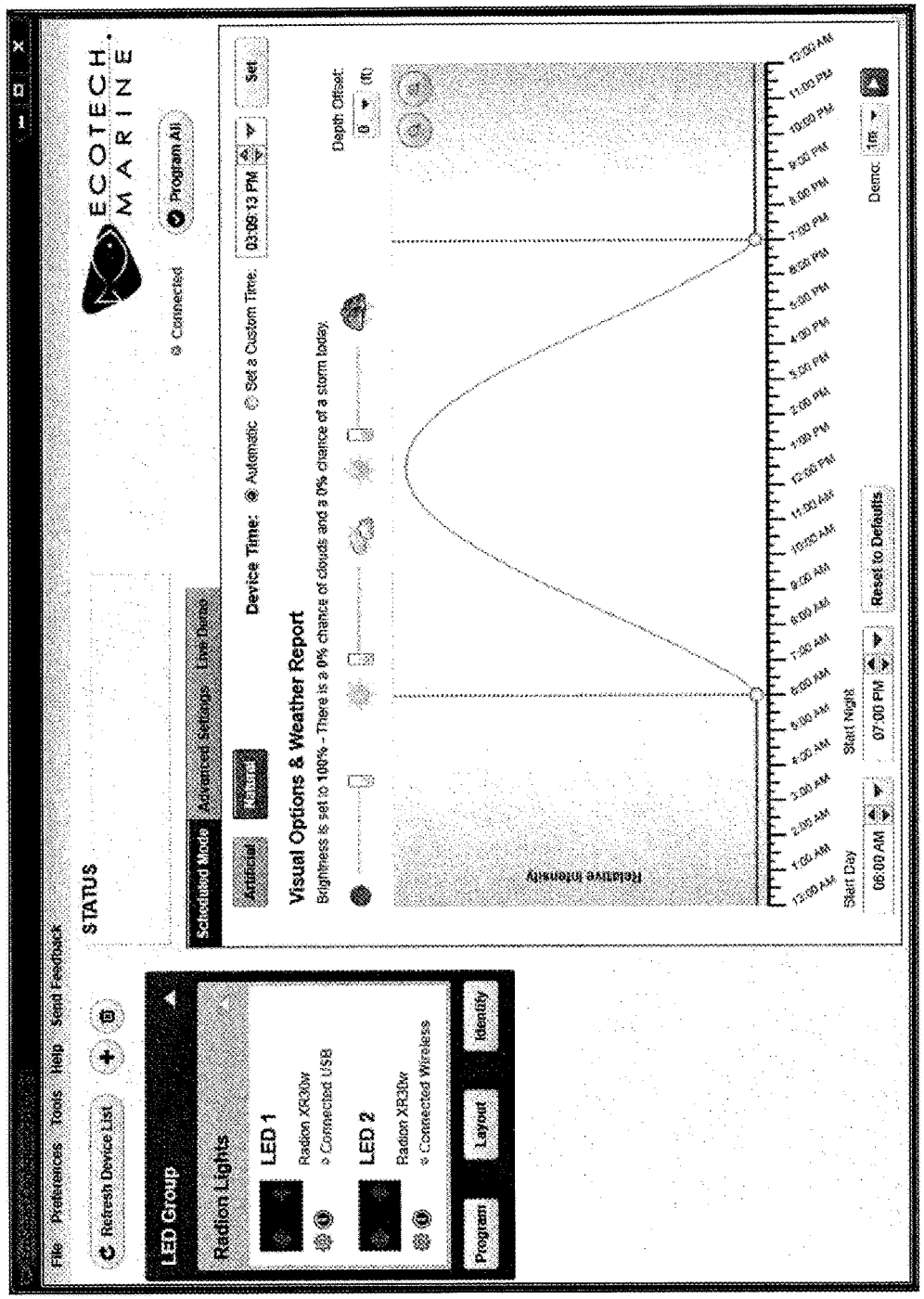
FIG. 17 is a screen-shot of an exemplary software program for programming the lighting unit.
Figure 18:
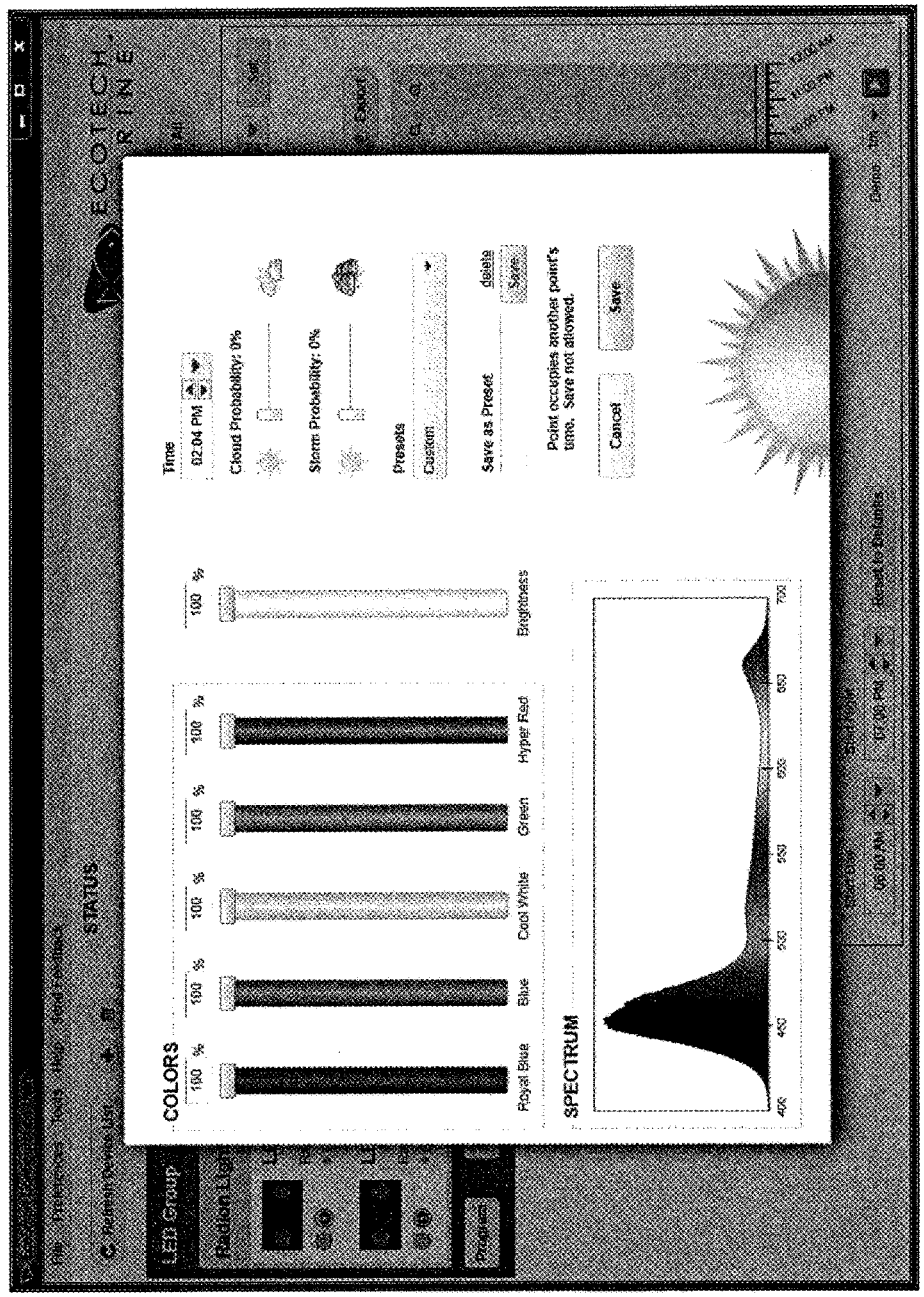
FIG. 18 is another screen-shot of an exemplary software program for programming the lighting unit.
Figure 19:
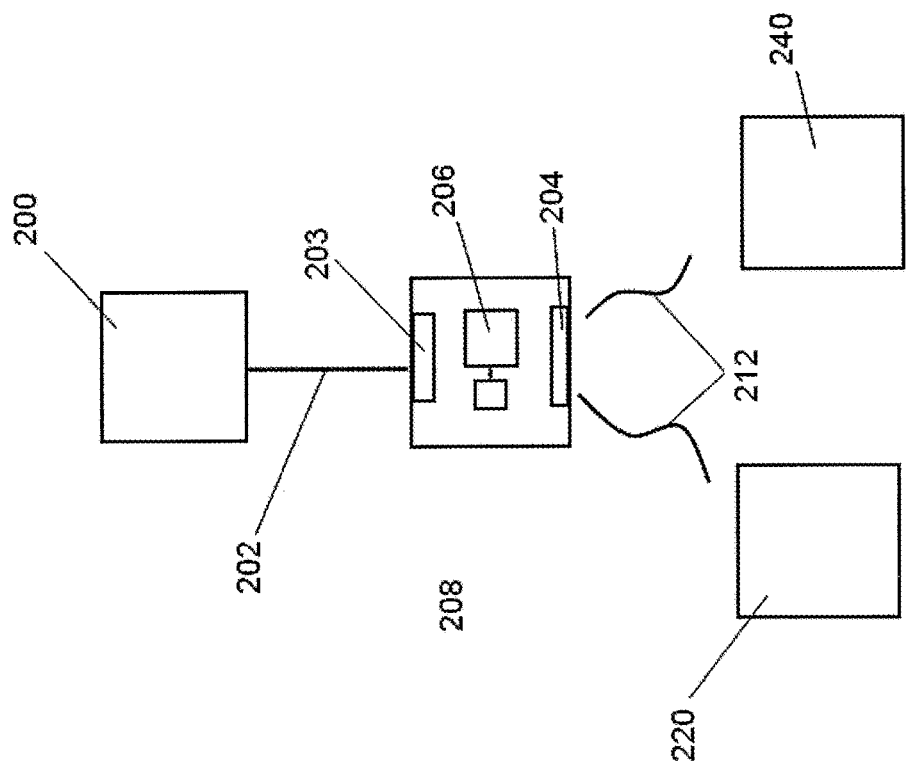
FIG. 19 is a schematic view of an exemplary lighting unit connected to external devices.

As best shown in FIGS. 17-19, software may be provided to a user for allowing a user to program, monitor and control the lighting unit 10 and other components of the habitat 12. As best shown in FIG. 19, a user may access the software at a location 200. The software may be provided locally on a user device or hosted on a remote server with access provided through the Internet. The software may be compatible with a variety of operating systems, including MAC, Windows, Linux, and mobile based operating systems. As best shown in FIGS. 17 and 18, a user may create a profile having different light colors and intensities associated with different times of day. The profile may be displayed to a user through various outputs, including the graphical output shown in FIG. 17.

Profiles may then be implemented by one or more lighting units. In an exemplary embodiment, a user connects a first lighting unit 210 to a computer 200, for example through a USB connection 202 to a USB port 203. The first lighting unit 210 may then connect to additional components in the habitat 12, for example, a second lighting unit 220 and a pump 240, such as pumps 22 depicted in FIGS. 1A and 1B. In an exemplary embodiment, the first lighting unit 210 may include a communication unit 204 to connect to additional components through a wireless connection 212, though a hard connection may also be used. As best shown in FIG. 18, a user may adjust the intensity of each color provided with the lighting unit 210 and the overall brightness produced by the lighting unit 210. A user may also select additional weather related conditions such as clouds and storm probability. Various pre-set profiles may be provided to a user to accept or modify, or a user may create an individual profile from scratch.

The lighting unit 210 may receive data related to a selected profile. The first lighting unit 210 may include a microprocessor 206 for processing the data received from the computer 200. The microprocessor may include or be operably associated with memory 208 for storing the received data. The lighting unit 210 initiates the profile, creating the selected light and weather patterns. For example, if a storm profile has been selected, the lighting unit may dim to mimic cloud cover and initiate brief flashes of bright light to mimic lightning. The lighting unit 10 may be capable of storing a received profile and repeatedly executing the profile until different instructions are received. The lighting unit 10 may also be capable of storing a number of profiles, for example a number of profiles representing each day in a year.

If more than one lighting unit 210 is present in a habitat 12, the software may sync the lighting units together so that that they act in concert with one another. Depending on the number of lighting units 210 and the layout of the habitat 12, the lighting units 210, 220 may be synced to provide identical outputs or to provide complimentary outputs. For example, in the storm profile discussed above, one lighting unit 10 may flash to mimic lightning while other lighting units 210, 220 remain dark to mimic lightning from different locations and angles. In another example, during a sunrise profile, the lighting unit 210 positioned furthest to the east may begin to increase intensity and change color prior to additional lighting units 220. The orchestration between features may be programmed by the user and/or automatically selected by the software. As discussed above, the lighting units 210, 220 may also be synchronized with other components in the habitat 12, such as pumps 22. For example, different tides can be associated with different times and light patterns, and the flow of the pumps 22 may be adjusted accordingly. In the storm profile example, the pumps 22 may pulse to mimic heavy seas and strong winds.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

Only those claims which use the words "means for" are presumed to be interpreted under 35 U.S.C. 112, sixth paragraph.

What is claimed:

1. A lighting unit comprising:
   a housing;
   a light emitter assembly at least partially received in the housing, the light emitter assembly comprising a light emitter;
   a heat sink disposed vertically over the light emitter assembly; and
   a fan assembly at least, partially received in the housing and disposed laterally adjacent to the emitter assembly, the fan assembly comprising a fan blade for generating airflow, and a curved baffle situated over the fan blade for directing the airflow.

2. The lighting unit of claim 1, wherein the curved baffle is configured to direct airflow in the direction of the heat sink.

3. The lighting unit of claim 1, further comprising a microprocessor electrically connected to the light emitter assembly and the fan assembly.

4. The lighting unit of claim 3, wherein the light emitter comprises a first light emitter having a first color and the light emitter assembly further comprises a second light emitter having a second color, the first light emitter being controlled on a first channel and the second light emitter being controlled on a second channel.

5. The lighting unit of claim 3, further comprising a communication unit operably connected to the microprocessor.

6. The lighting unit of claim 1, wherein the housing comprises a bottom cover having openings for receiving the fan assembly and the light emitter assembly.

7. A habitat comprising:
   a marine aquarium; and
   the lighting unit of claim 1 above the marine aquarium.

8. A lighting unit comprising:
   a core comprising a first side region, a second side region, and an interior region disposed between the first side region and the second side region, the interior region comprising an opening and a heat sink for dissipating heat;
   a first light emitter assembly connected to the core, the first light emitter assembly comprising a first light emitter device;
   a second light emitter assembly connected to the core, the second light emitter assembly comprising a second light emitter device; and
   a fan disposed between and laterally to the first and second light emitter assemblies, the fan configured for generating airflow along the heat sink.

9. The lighting unit of claim 8, wherein the fan comprises:
   a fan blade for generating the airflow;
   a blade housing at least partially receiving the fan blade;
   a grate; and
   a hood for directing the airflow to the heat sink.

10. The lighting unit of claim 9, wherein the hood comprises a first curved baffle and a second curved baffle situated over the fan blade.

11. The lighting unit of claim 10, wherein the heat sink comprises a first heat sink and a second heat sink, and wherein the first curved baffle directs air from the fan to the first heat sink and the second curved baffle directs air from the fan to the second heat sink.

12. The lighting unit of claim 8, wherein the first and second light emitter devices comprise light emitting diodes.

13. The lighting unit of claim 11, wherein the core is a unitary piece of extruded material.

14. The lighting unit of claim 11, further comprising a microprocessor electrically connected to the first and second emitter assemblies and the fan.

15. The lighting unit of claim 8, wherein the first emitter assembly further comprises a total-internal-reflection lens.

16. The lighting unit of claim 1, wherein the fan assembly is disposed laterally in a same plane as the light emitter assembly.

17. The lighting unit of claim 8, wherein the fan is disposed laterally in a same plane as the first and second light emitter devices.

18. A habitat comprising
    a marine aquarium; and
    the lighting unit of claim 8 above the marine aquarium.

19. A habitat, comprising:
    a marine aquarium;
    a lighting unit positioned to emit light on the marine aquarium, the light unit comprising a housing, a light emitter assembly at least partially received in the housing, a heat sink disposed vertically over the light emitter assembly, and a fan assembly at least partially received in the housing;

a pump configured to control water flow in the marine aquarium; and a microprocessor configured to control both the lighting unit and the pump to thereby affect environmental conditions within the marine aquarium.

20. The habitat of claim 19, wherein the microprocessor is configured to control both the light emitter assembly and the fan assembly of the lighting unit.

21. The habitat of claim 19, further comprising a communication unit configured to communicate with both the light emitter assembly and the pump to provide operating information.

\* \* \* \* \*